United States Patent
Mizoguchi

(10) Patent No.: US 8,693,076 B2
(45) Date of Patent: Apr. 8, 2014

(54) IMAGE FORMING APPARATUS

(75) Inventor: Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 373 days.

(21) Appl. No.: 13/024,382

(22) Filed: Feb. 10, 2011

(65) Prior Publication Data

US 2011/0205609 A1    Aug. 25, 2011

(30) Foreign Application Priority Data

Feb. 23, 2010  (JP) ................................. 2010-037998

(51) Int. Cl.
    *G02B 26/08*  (2006.01)
(52) U.S. Cl.
    USPC ....................................................... 359/224.1
(58) Field of Classification Search
    USPC .......... 359/201.2, 202.1, 204.2, 205.1, 224.1
    See application file for complete search history.

(56) References Cited

U.S. PATENT DOCUMENTS

| | | | | |
|---|---|---|---|---|
| 4,302,709 | A * | 11/1981 | Tichtinsky | 318/116 |
| 5,529,277 | A * | 6/1996 | Ostaszewski | 248/603 |
| 5,912,608 | A | 6/1999 | Asada | |
| 5,999,303 | A * | 12/1999 | Drake | 359/224.1 |
| 6,359,718 | B1 * | 3/2002 | Lin et al. | 359/224.1 |
| 6,501,588 | B1 * | 12/2002 | Rosa et al. | 359/290 |
| 6,681,063 | B1 * | 1/2004 | Kane et al. | 385/18 |
| 6,806,991 | B1 * | 10/2004 | Sarkar et al. | 359/290 |
| 6,817,725 | B2 * | 11/2004 | Mizuno et al. | 359/877 |
| 6,876,124 | B1 * | 4/2005 | Lin et al. | 310/309 |
| 7,295,726 | B1 | 11/2007 | Milanovic et al. | |
| 7,428,353 | B1 | 9/2008 | Milanovic et al. | |
| 7,554,711 | B2 * | 6/2009 | Miles | 359/224.1 |
| 7,605,965 | B2 * | 10/2009 | Tani et al. | 359/224.1 |
| 7,667,868 | B2 * | 2/2010 | Hayashi et al. | 358/1.7 |
| 7,813,021 | B2 * | 10/2010 | Akatsu | 359/204.1 |
| 7,832,880 | B2 * | 11/2010 | Craig | 359/872 |
| 7,872,394 | B1 | 1/2011 | Gritters et al. | |
| 8,148,874 | B2 * | 4/2012 | Xie et al. | 310/307 |
| 2002/0001118 | A1* | 1/2002 | Nakajima et al. | 359/204 |
| 2008/0061026 | A1 | 3/2008 | Milanovic et al. | |
| 2009/0261688 | A1 | 10/2009 | Xie et al. | |
| 2011/0181933 | A1 | 7/2011 | Kubo et al. | |
| 2011/0205608 | A1 | 8/2011 | Mizoguchi | |

FOREIGN PATENT DOCUMENTS

| | | |
|---|---|---|
| JP | 08-322227 | 12/1996 |
| JP | 2005-181395 | 7/2005 |

* cited by examiner

*Primary Examiner* — Frank Font
(74) *Attorney, Agent, or Firm* — Harness, Dickey & Pierce, P.L.C.

(57) ABSTRACT

An image forming apparatus has a light output unit, a light scanner that has a light reflection part reflecting the light from the light output unit, rotates the light reflection part around two axes, and scans with the light reflected by the light reflection part, and a scanner rotating unit the rotates the light scanner around a predetermined axis line while keeping a relative positional relation between an intersection of the two rotation axes and the light output unit constant, and the light scanner has a movable unit including the light reflection part, four connection parts provided at intervals of 90 degrees in an outer circumference of the movable unit, each of the connection parts has a shaft part that connects the movable unit and the drive unit and independently and bendingly deforms each of the shaft parts, and thereby, the movable unit rotates around the two axes.

19 Claims, 22 Drawing Sheets

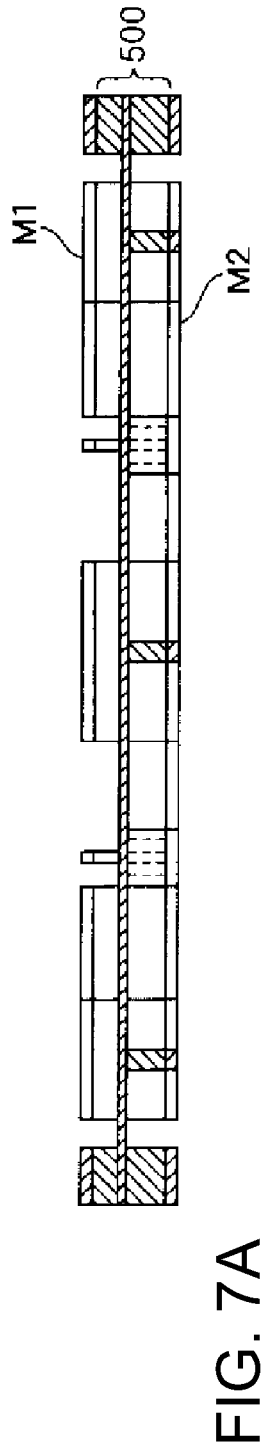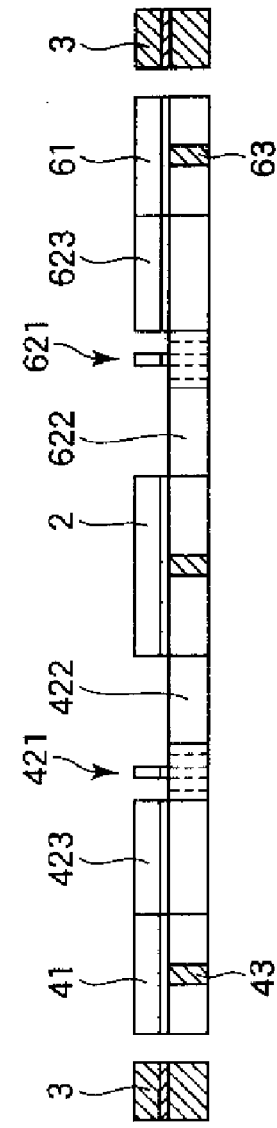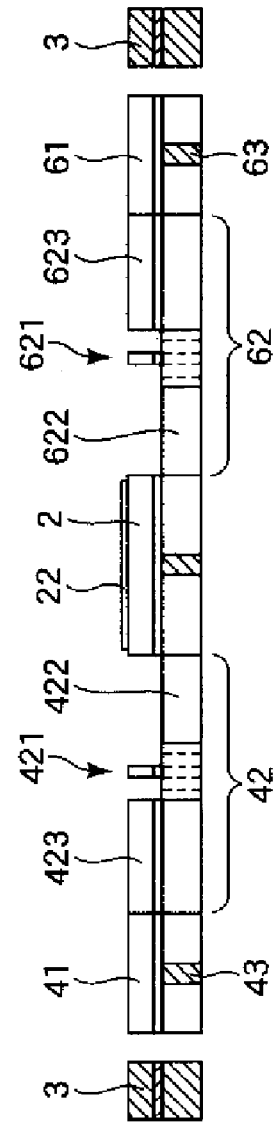

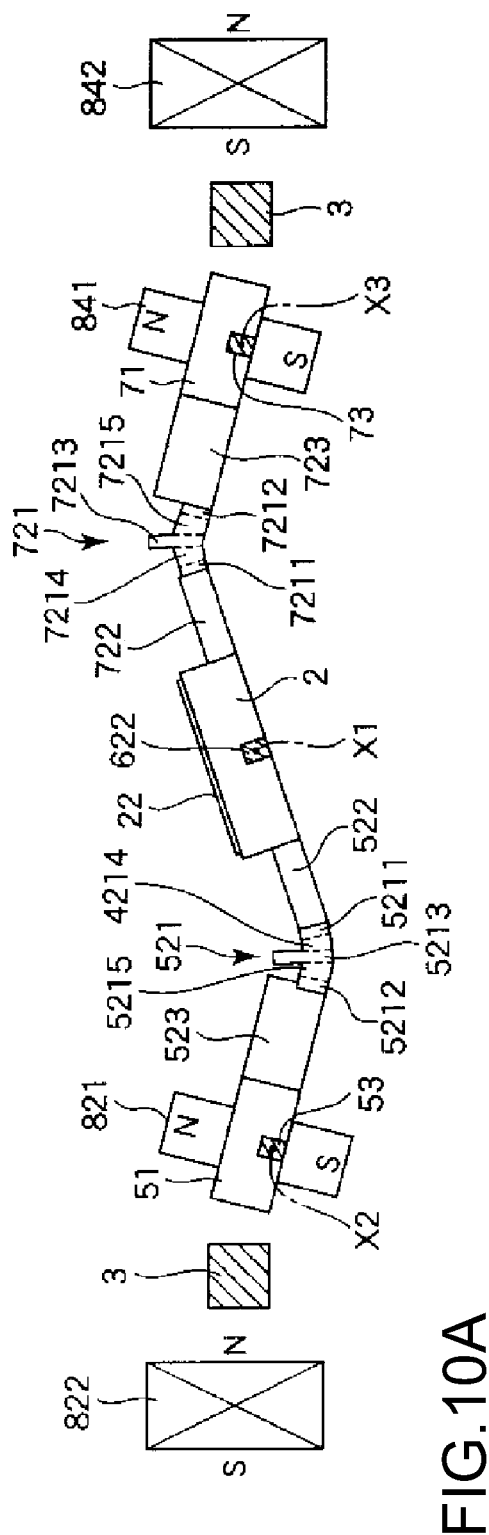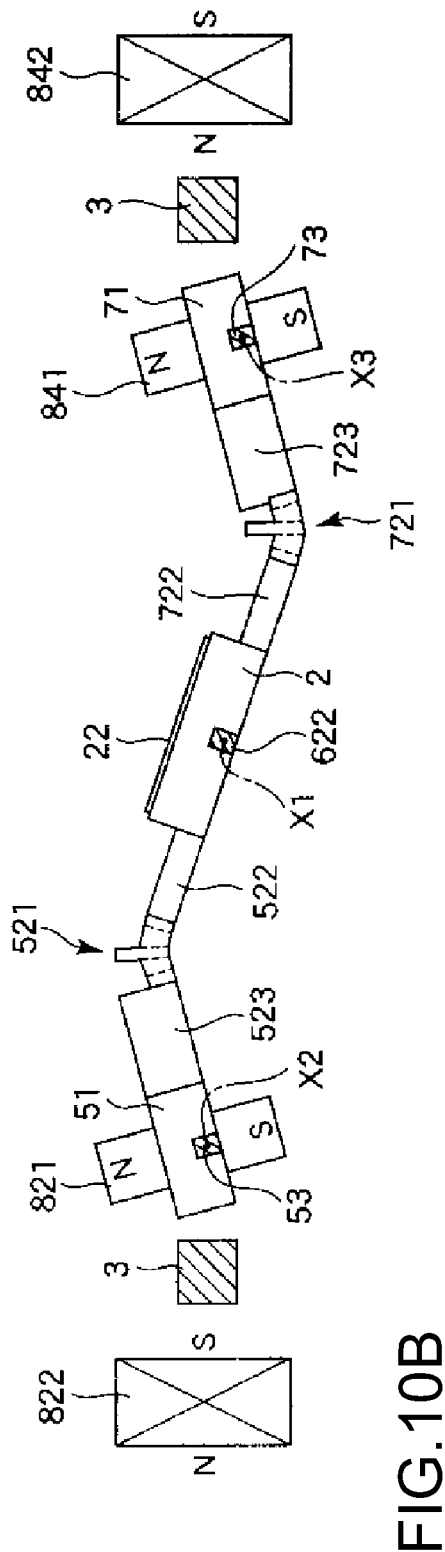
FIG.10A
FIG.10B

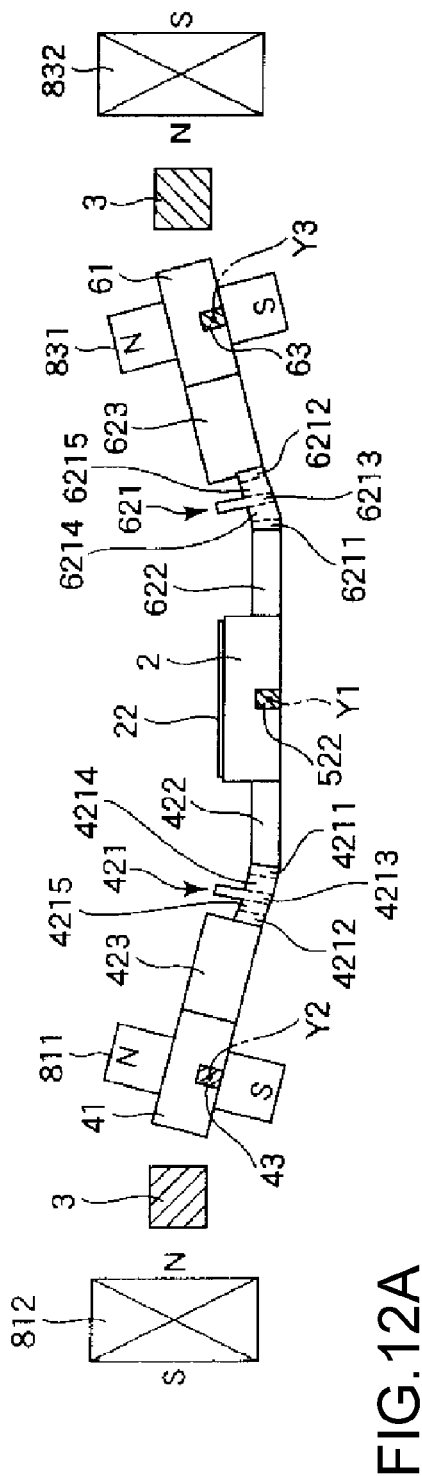
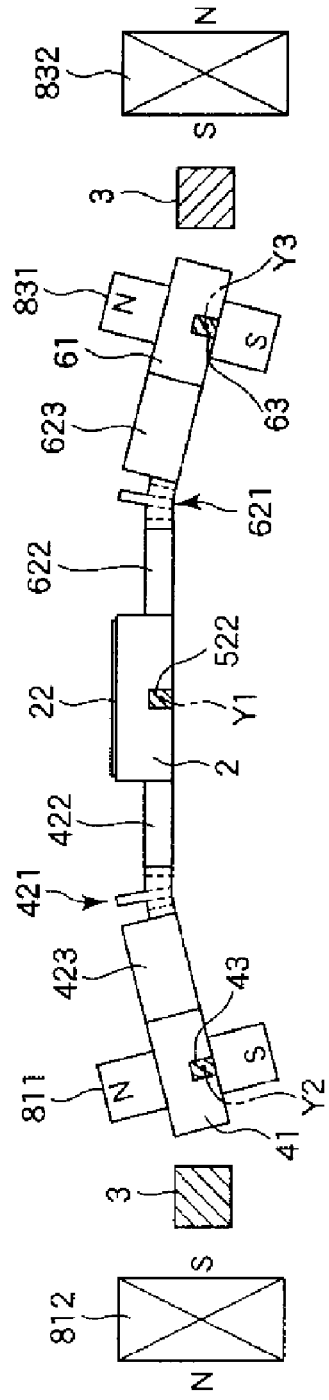
FIG.12A
FIG.12B

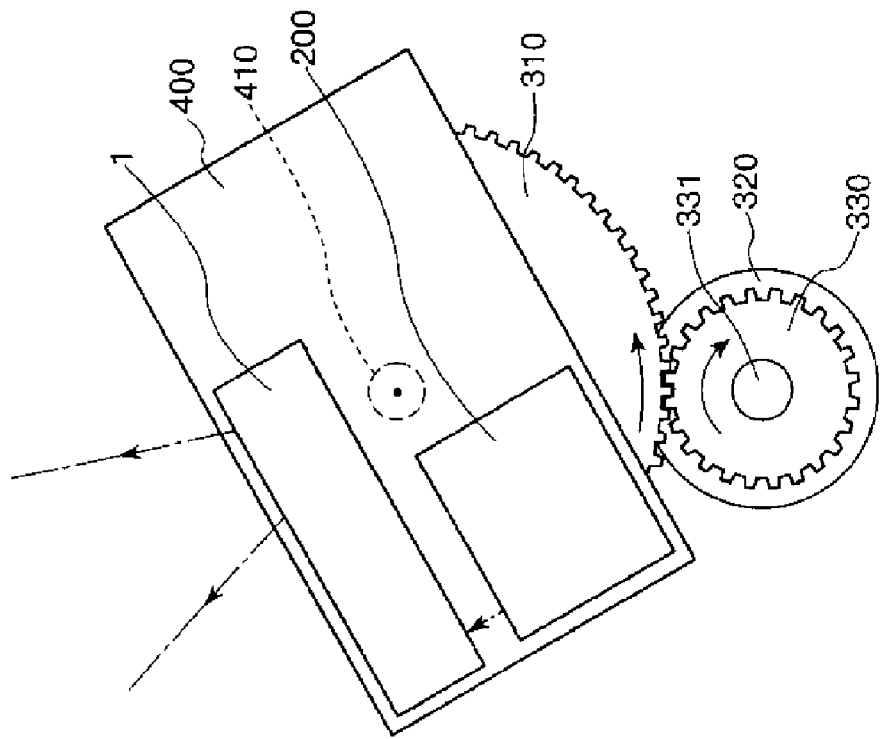
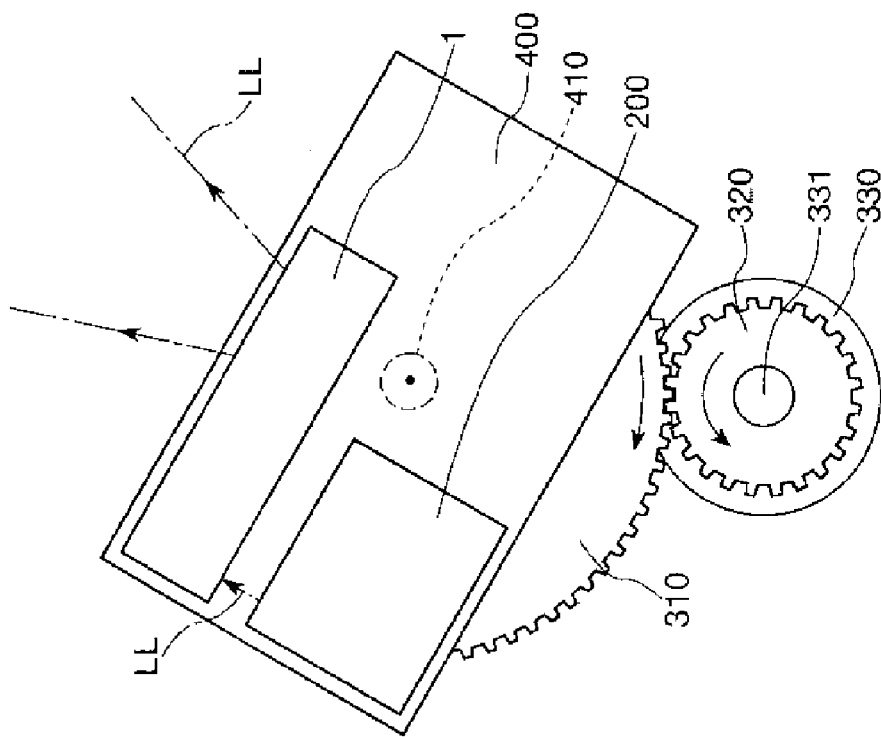
FIG.14A
FIG.14B

IMAGE FORMING APPARATUS

BACKGROUND

1. Technical Field

The present invention relates to an image forming apparatus.

2. Related Art

For example, as a light scanner for depicting by light scanning in a laser printer or the like, a scanner using an actuator including torsional vibrators is known (for example, see Patent Document 1 (JP-A-2005-181395)).

In Patent Document 1, an actuator having an insulating substrate on which a pair of permanent magnets are provided, and a scanner main body supported by the insulating substrate to be located between the pair of permanent magnets is disclosed. Further, the scanner main body has a frame-shaped support part, a frame-shaped outer movable plate provided inside of the support part, an inner movable plate (mirror) provided inside of the outer movable plate. Furthermore, the outer movable plate is connected to the support part via a pair of first torsion bars extending in the X-axis direction, and the inner movable plate is connected to the outer movable plate via a second torsion bar extending in the Y-axis direction orthogonal to the X-axis direction. In addition, coils are respectively provided on the outer movable plate and the inner movable plate.

In the actuator having the above described configuration, by allowing the magnetic fields generated from the respective coils by energization and the magnetic field generated between the pair of permanent magnets to act, the outer movable plate together with the inner movable plate rotate around the X-axis with the first torsion bars as center axes, and the inner movable plate rotates around the Y-axis with the second torsion bar as a center axis. In this manner, in the actuator of Patent Document 1, the inner movable plate is two-dimensionally rotated, and thereby, two-dimensional scanning is performed with the light reflected by the inner movable plate. Such a configuration is effective in that two-dimensional scanning with light can be performed by one light scanner.

However, in the actuator of Patent Document 1, the rotation angle of the inner movable plate has limitations, and it is difficult to enlarge a region in which scanning with light may be performed. To set the light scanning region larger using the actuator of Patent Document 1, for example, it is conceivable that the separation distance between the light scanning region and the actuator is made longer, however, there are problems that an obstacle such as a human easily enters between the light scanning region and the actuator, it is highly possible that the light is blocked by the obstacle, and the installation condition is limited.

SUMMARY

An advantage of some aspects of the invention is to provide an image forming apparatus that can secure a large light scanning region even when installed near the light scanning region.

An image forming apparatus according to an aspect of the invention includes a light output unit that outputs light, a light scanner that has a light reflection part reflecting the light output from the light output unit, rotates the light reflection part respectively around a first axis and a second axis orthogonal to each other, and scans with the light reflected by the light reflection part respectively around the first axis and the second axis, and a scanner rotating unit that rotates the light scanner around a predetermined axis line while keeping a relative positional relation between an intersection of the first axis and the second axis and the light output unit constant, wherein the light scanner has a movable unit including the light reflection part, a scanner support part that supports the movable unit, and four connection parts connecting the movable unit and the scanner support part, the four connection parts are provided at intervals of 90 degrees in an outer circumference of the movable unit along a circumferential direction in a plan view of the movable unit, each of the connection parts has a drive unit provided separately from the movable unit and rotatable relative to the scanner support part, and a shaft part that connects the movable unit and the drive unit, the shaft part of each of the connection parts is adapted to bendingly deform in a thickness direction of the movable unit in the middle in the separation direction from the movable unit by rotation of the drive unit, the respective shaft parts are independently bendingly deformed, and thereby, the movable unit rotates around the respective axes of the first axis and the second axis.

Thereby, an image forming apparatus that can secure a large light scanning region even when installed near the light scanning region may be provided.

In the image forming apparatus according to the aspect of the invention, it is preferable that the light scanner scans with the light by vector scan of sequentially forming line segments connecting different two points on a display surface to which the light reflected by the light reflection part is applied.

According to the scanning method (vector scan), scanning with light may be performed only in the region to which the light is desired to be applied, and an image may efficiently be displayed.

In the image forming apparatus according to the aspect of the invention, it is preferable that the apparatus further has a support part that supports the light output unit and the light scanner while maintaining a relative positional relation to each other, wherein the scanner rotating unit is adapted to be capable of rotating the light output unit and the light scanner integrally with the support part.

Thereby, the light scanning region (the region in which an image is displayed) may be changed without the need of alignment adjustment of the light output unit and the light scanner.

In the image forming apparatus according to the aspect of the invention, it is preferable that the scanner rotating unit includes a motor.

Thereby, the image forming apparatus may be made relatively simple and inexpensive.

In the image forming apparatus according to the aspect of the invention, it is preferable that, given that the two axes orthogonal in the plan view of the movable unit are the X-axis and the Y-axis, the four connection parts have a first connection part and a second connection part opposed in an X-axis direction via the movable unit and a third connection part and a fourth connection part opposed in a Y-axis direction via the movable unit, each of the first connection part and the second connection part has the drive unit provided separately from the movable unit in the X-axis direction, a first shaft part as the shaft part connecting the movable unit and the drive unit and extending in the X-axis direction, and a second shaft part connecting the drive unit and the scanner support part and extending in the Y-axis direction, and each of the third connection part and the fourth connection part has the drive unit provided separately from the movable unit in the Y-axis direction, a first shaft part as the shaft part connecting the movable unit and the drive unit and extending in the Y-axis direction, and a second shaft part connecting the drive unit and the scanner support part and extending in the X-axis direction.

Thereby, the movable unit may stably be supported. Further, the rotations of the movable unit around the respective axes of the two axes orthogonal to each other may independently be performed. Accordingly, the light scanner becomes suitable for vector scan.

In the image forming apparatus according to the aspect of the invention, it is preferable that, given that an axis orthogonal to the X-axis and the Y-axis is the Z-axis, each of the first shaft parts of the four connection parts may perform a first deformation of bending into a V-shape convex toward one side in the Z-axis direction, and a second deformation of bending into a V-shape convex toward the other side in the Z-axis direction.

As described above, the respective first shaft parts are bent, and thereby, the movable unit may efficiently be displaced.

In the image forming apparatus according to the aspect of the invention, it is preferable that a state in which the first shaft part of the first connection part is allowed to perform the first deformation and the first shaft part of the second connection part is allowed to perform the second deformation and a state in which the first shaft part of the first connection part is allowed to perform the second deformation and the first shaft part of the second connection part is allowed to perform the first deformation are alternately repeated, and thereby, the movable unit is rotated around the Y-axis, and a state in which the first shaft part of the third connection part is allowed to perform the first deformation and the first shaft part of the fourth connection part is allowed to perform the second deformation and a state in which the first shaft part of the third connection part is allowed to perform the second deformation and the first shaft part of the fourth connection part is allowed to perform the first deformation are alternately repeated, and thereby, the movable unit is rotated around the X-axis.

Thereby, the movable unit may smoothly be rotated.

In the image forming apparatus according to the aspect of the invention, it is preferable that each of the first shaft parts of the four connection parts has a stress relaxing portion provided between the movable unit and the drive unit, a movable unit side shaft portion connecting the stress relaxing portion and the movable unit, and a drive unit side shaft portion connecting the stress relaxing portion and the drive unit, and bends in the stress relaxing portion.

Thereby, the stresses received by the movable unit side shaft portions may be relaxed in the stress relaxing portions, and prevented or suppressed from transmitting to the drive unit side shaft portions.

In the image forming apparatus according to the aspect of the invention, it is preferable that each of the movable unit side shaft portions of the four connection parts torsionally deforms around a center axis of the movable unit side shaft portion.

Thereby, the rotations of the movable unit around the opposed pair of connection parts of the four connection parts may be allowed by torsional deformation of the movable unit side shaft portions of the other pair of connection parts. Accordingly, the movable unit may smoothly be rotated around the respective axes of the two axes orthogonal to each other.

In the image forming apparatus according to the aspect of the invention, it is preferable that each of the drive unit side shaft portions of the four connection parts does not deform.

Thereby, the stresses generated by the rotations of the drive units may efficiently be used for rotations of the movable unit. Accordingly, the movable unit may be displaced at large rotation angles with power-saving.

In the image forming apparatus according to the aspect of the invention, it is preferable that each of the stress relaxing portions of the four connection parts has a deforming portion that extends in a direction orthogonal to an extending direction of the movable unit side shaft portion and the drive unit side shaft portion in the plan view of the movable unit and torsionally deforms around a center axis.

Thereby, the torsional deformations of the deforming portions may effectively relax the stresses applied to the first shafts.

In the image forming apparatus according to the aspect of the invention, it is preferable that each of the stress relaxing portions of the four connection parts has a pair of the deforming portions, and one deforming portion of the pair of deforming portions is connected to the movable unit side shaft portion and the other deforming portion is connected to the drive unit side shaft portion.

Thereby, the torsional deformations of the deforming portions may effectively relax the stresses applied to the first shafts.

In the image forming apparatus according to the aspect of the invention, it is preferable that each of the stress relaxing portions of the four connection parts has a non-deforming portion provided between the pair of the deforming portions, extending in a direction in parallel to an extending direction of the deforming portions, and does not torsionally deform around the center axis.

Thereby, in the respective connection parts, the first shaft parts may be bent with the non-deforming portions as axes. Accordingly, the first shaft parts of the respective connection parts may simply and reliably be bent, and the movable unit may stably be displaced.

In the image forming apparatus according to the aspect of the invention, it is preferable that each of the stress relaxing portions of the four connection parts has a section alternately extending and meandering in the X-axis direction and the Y-axis direction.

Thereby, the stresses received by the movable unit side shaft portions may be relaxed in the stress relaxing portions, and prevented or suppressed from transmitting to the drive unit side shaft portions.

In the image forming apparatus according to the aspect of the invention, it is preferable that each of the stress relaxing portions of the four connection parts has plural extending portions extending in the X-axis direction and plural extending portions extending in the Y-axis direction, and each of the plural extending portions is torsionally deformable and curvedly deformable around a center axis.

Thereby, at least ones of torsional deformations and curved deformations of the respective extending portions may effectively relax the stresses applied to the first shaft parts.

In the image forming apparatus according to the aspect of the invention, it is preferable that each of the four connection parts is formed by an SOI substrate in which a first Si layer, an $SiO_2$ layer, and a second Si layer are stacked in this order.

Thereby, the respective connection parts may easily be formed.

In the image forming apparatus according to the aspect of the invention, it is preferable that each of the non-deforming portions, the drive unit side shaft portions, and the drive units of the four connection parts includes the first Si layer, the $SiO_2$ layer, and the second Si layer, and each of the movable unit side shaft portions, the deforming portions, and the second shaft parts includes the second Si layer.

Thereby, the respective connection parts may easily be formed.

In the image forming apparatus according to the aspect of the invention, it is preferable that the apparatus includes a displacement providing unit that displaces the movable unit relative to the scanner support part, wherein four of the displacement providing units are provided in correspondence with the four connection parts.

Thereby, movements of the respective connection parts may independently be controlled.

In the image forming apparatus according to the aspect of the invention, it is preferable that each of the four displacement providing units has a permanent magnet provided in the corresponding drive unit, and a coil that generates a magnetic field acting on the permanent magnet.

Thereby, the configuration of the displacement providing unit is simple. Further, large power may be generated because of electromagnetic driving.

In the image forming apparatus according to the aspect of the invention, it is preferable that, in the four displacement providing units, the permanent magnets are provided so that both poles may be opposed in the thickness direction of the movable unit, and the coils are provided to generate magnetic fields in a direction orthogonal to the thickness direction of the movable unit.

Thereby, the movable unit may stably be displaced.

In the image forming apparatus according to the aspect of the invention, it is preferable that each of the permanent magnets of the four displacement providing units is provided through the drive unit.

Thereby, the movable unit may stably be displaced.

BRIEF DESCRIPTION OF THE DRAWINGS

The invention will be described with reference to the accompanying drawings, wherein like numbers reference like elements.

FIGS. 7A to 7C are sectional views for explanation of the manufacturing method of the vibration system of the light scanner shown in FIG. 3.

FIGS. 10A and 10B are diagrams for explanation of the driving of the light scanner shown in FIG. 3.

FIGS. 12A and 12B are diagrams for explanation of the driving of the light scanner shown in FIG. 3.

FIGS. 14A and 14B are diagrams seen from above for explanation of driving of the driving unit shown in FIG. 13.

DESCRIPTION OF EXEMPLARY EMBODIMENTS

Hereinafter, preferred embodiments of an image forming apparatus of the invention will be described with reference to the drawings.

First Embodiment

First, the first embodiment of the image forming apparatus of the invention will be explained.

Figure 1:
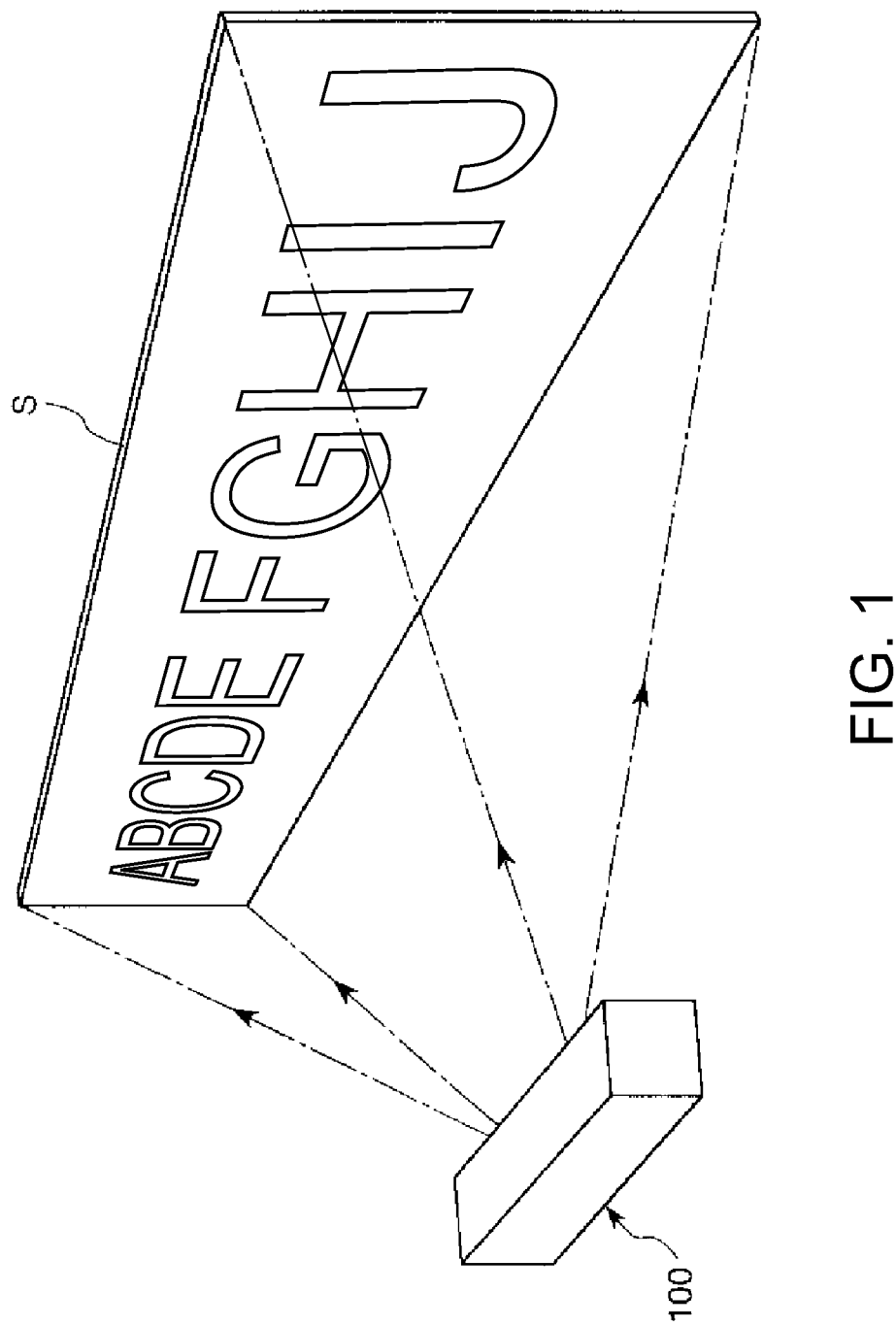
FIG. 1 shows a first embodiment of an image forming apparatus of the invention.
Figure 2:
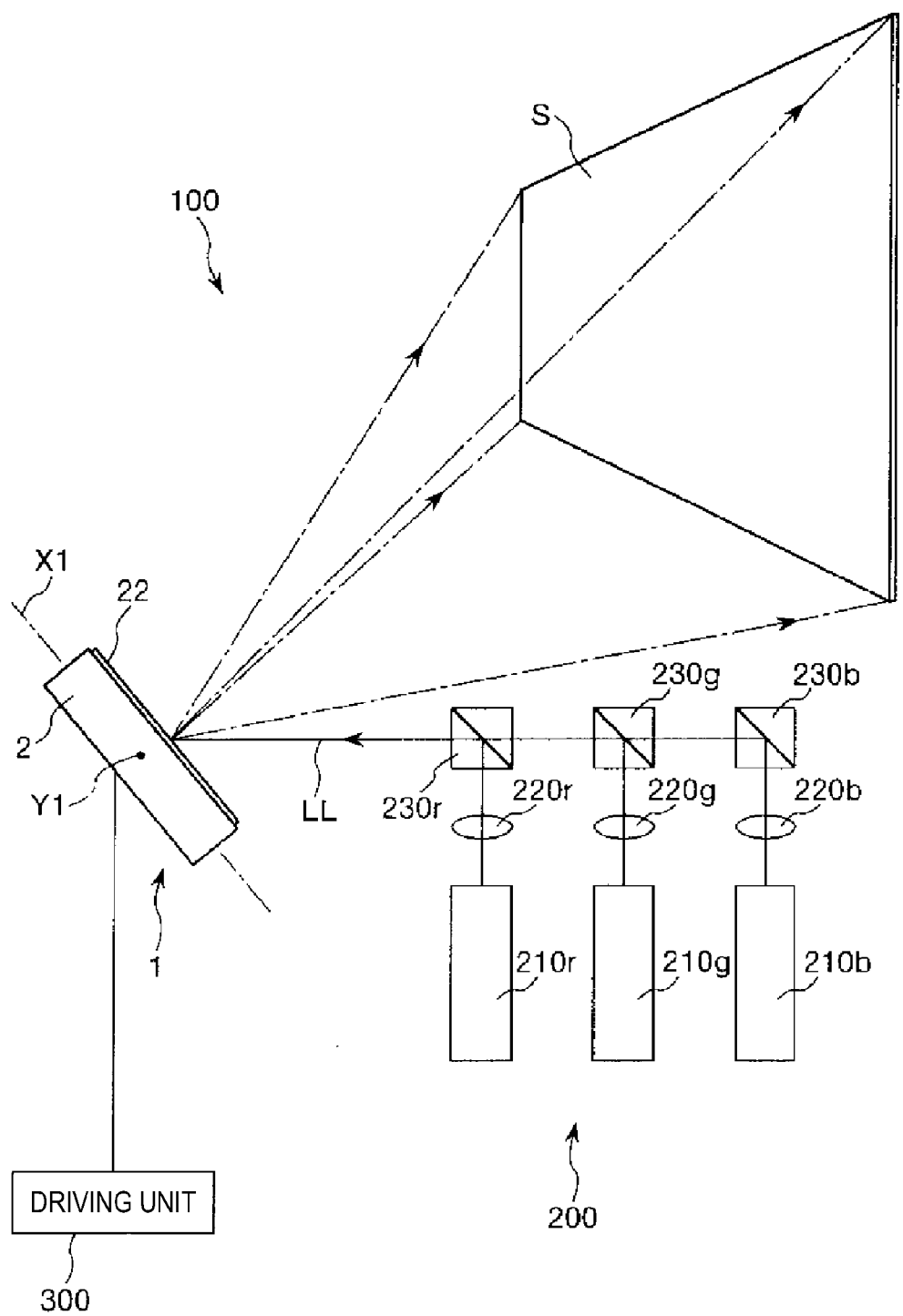
FIG. 2 shows a schematic configuration of the image forming apparatus shown in FIG. 1.
Figure 3:
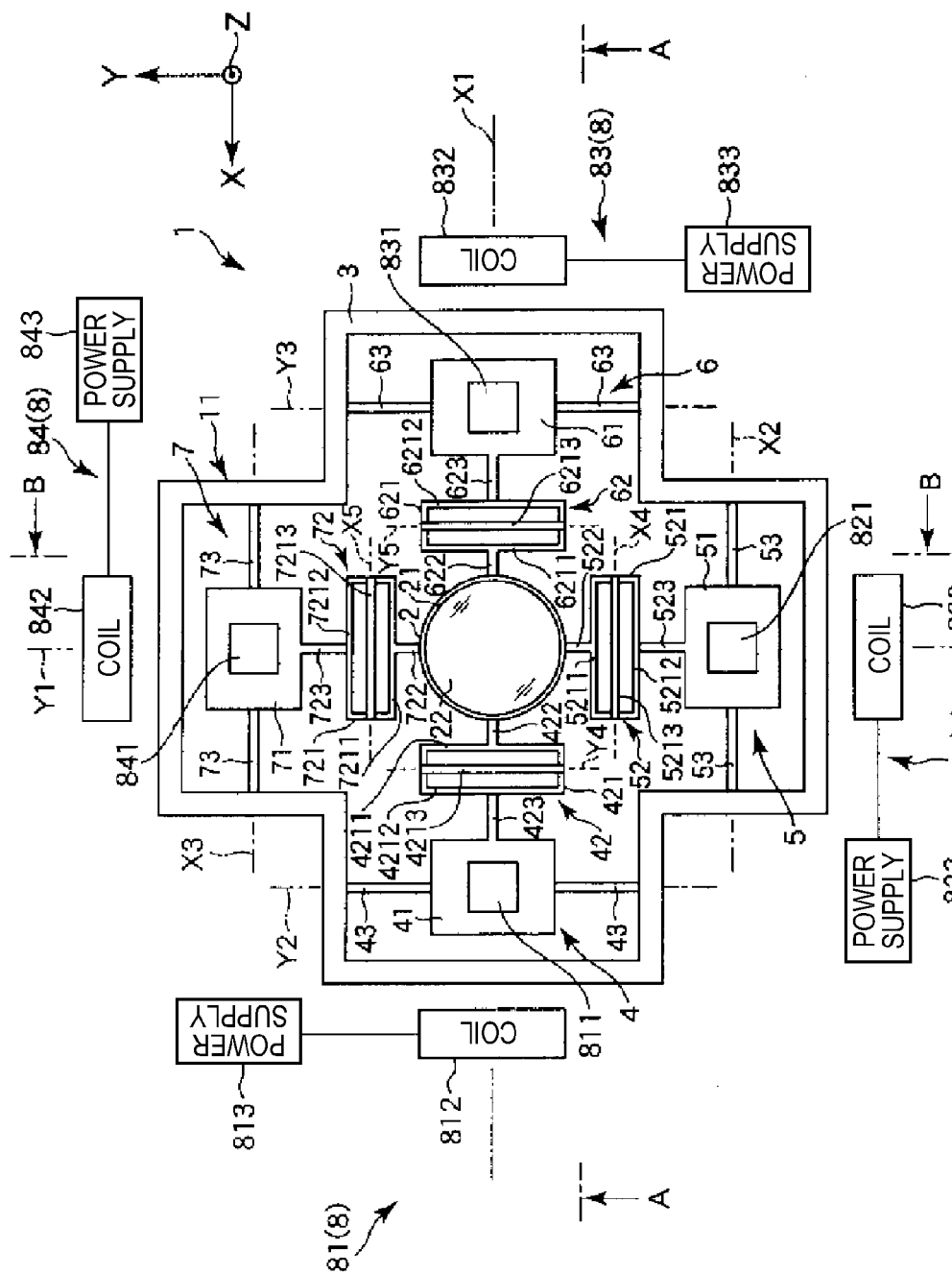
FIG. 3 is a plan view of a light scanner of the image forming apparatus shown in FIG. 1.
Figure 4:
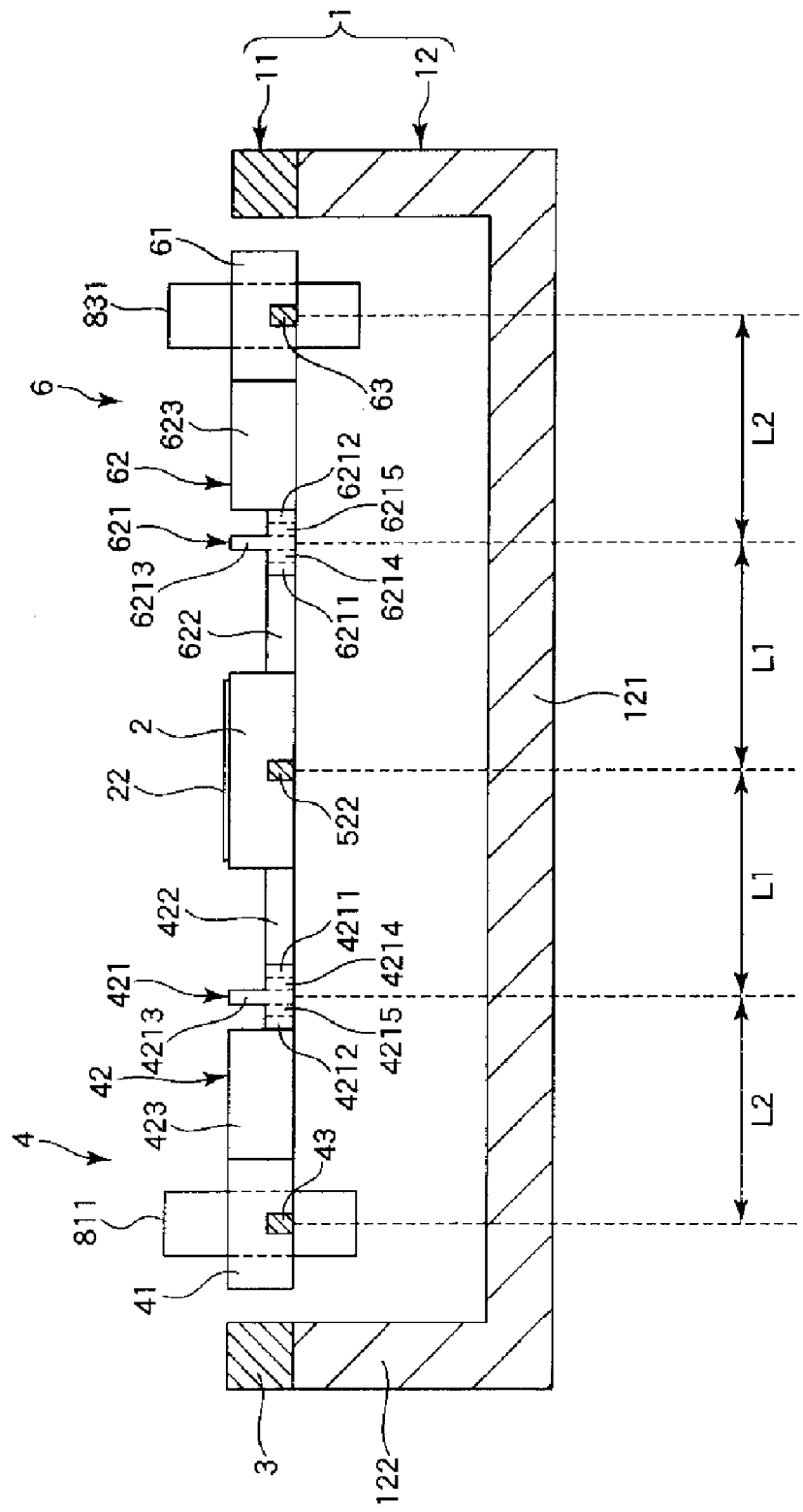
FIG. 4 is a sectional view of the light scanner shown in FIG. 3 (a sectional view along A-A line in FIG. 3).
Figure 5:
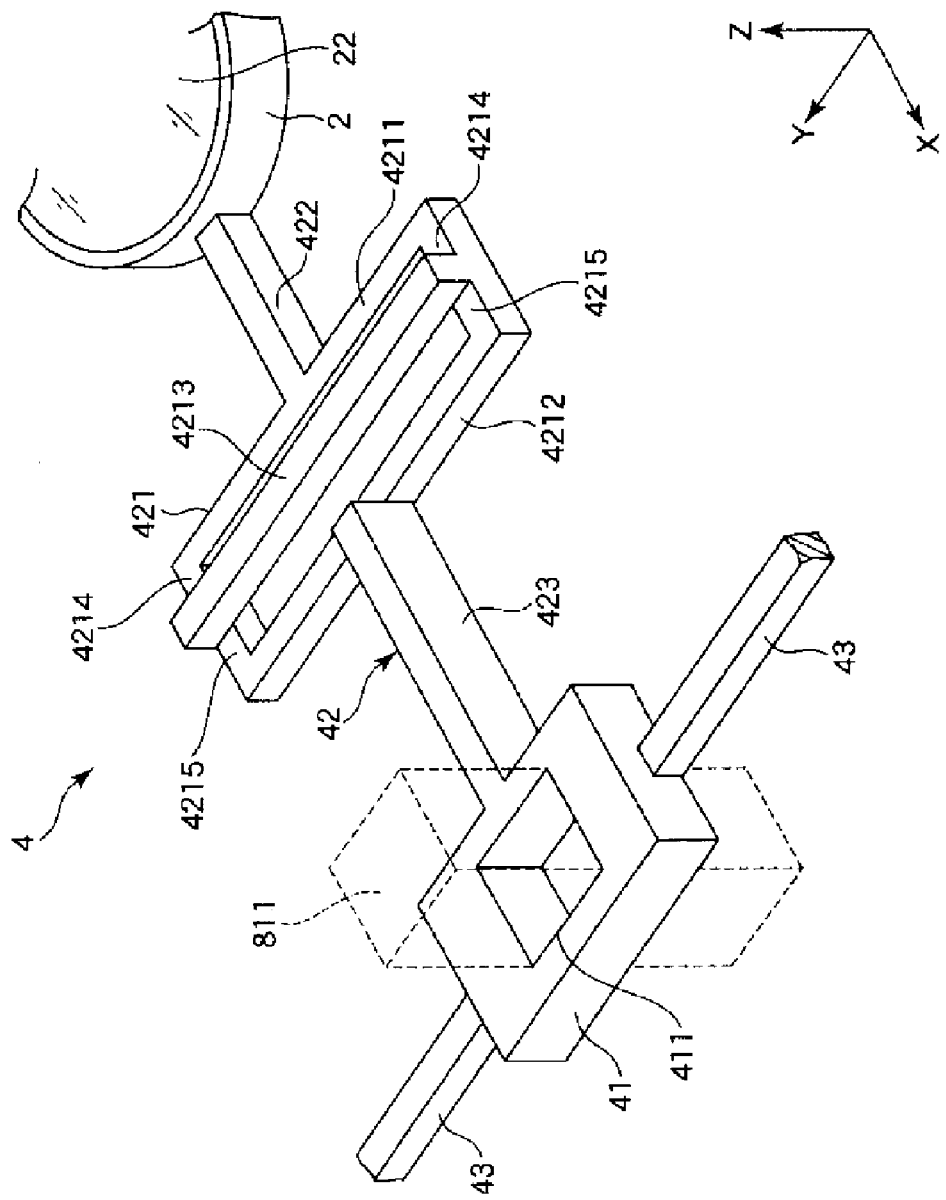
FIG. 5 is a perspective view of a connection part of the light scanner shown in FIG. 3.
Figure 8:
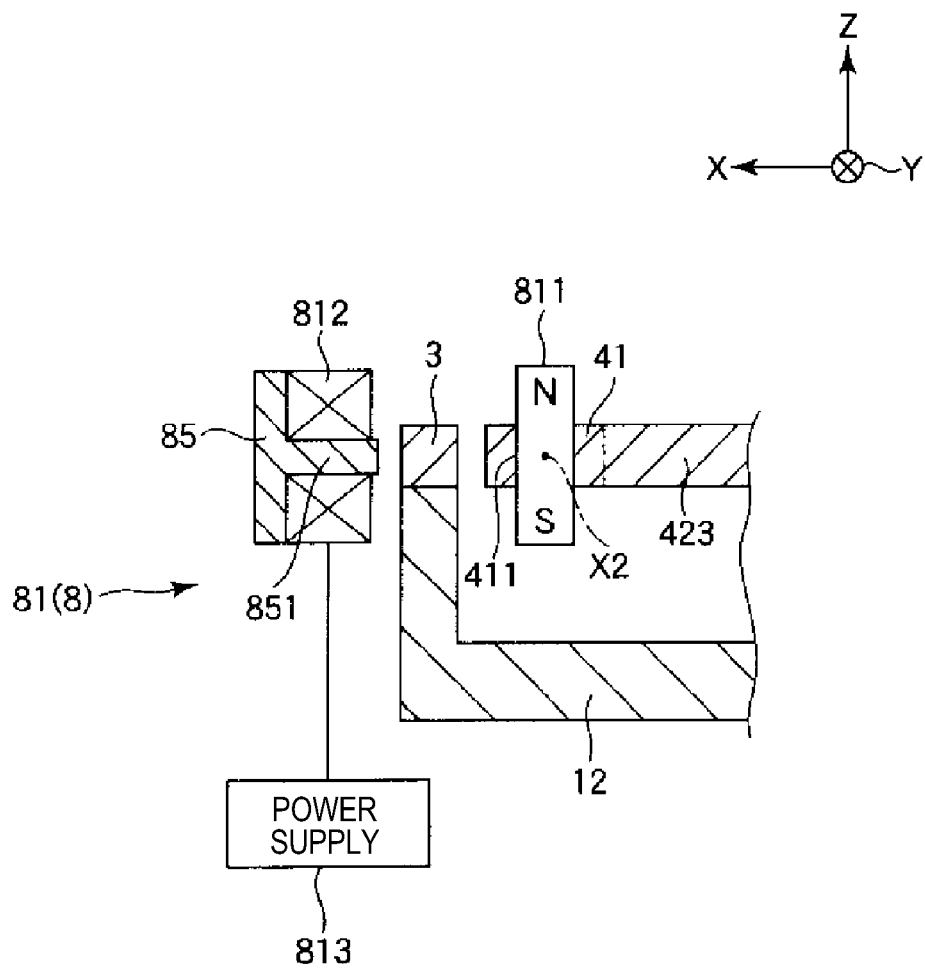
FIG. 8 is a diagram for explanation of a displacing unit of the light scanner shown in FIG. 3.
Figure 9A:
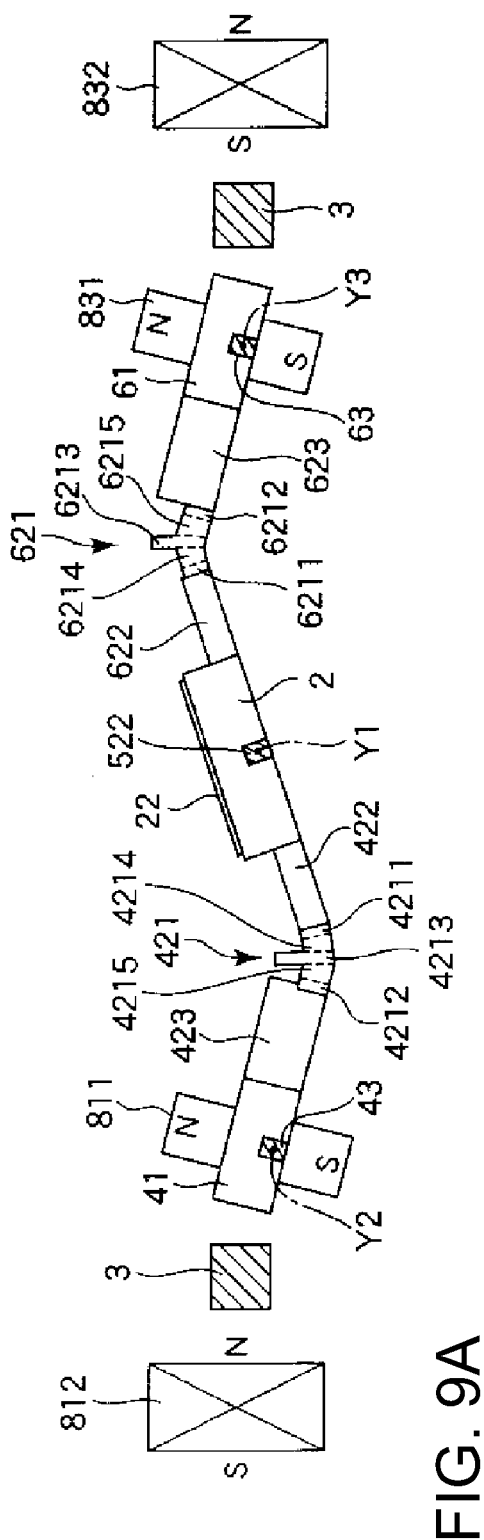
FIGS. 9A and 9B are diagrams for explanation of driving of the light scanner shown in FIG. 3.
Figure 9B:
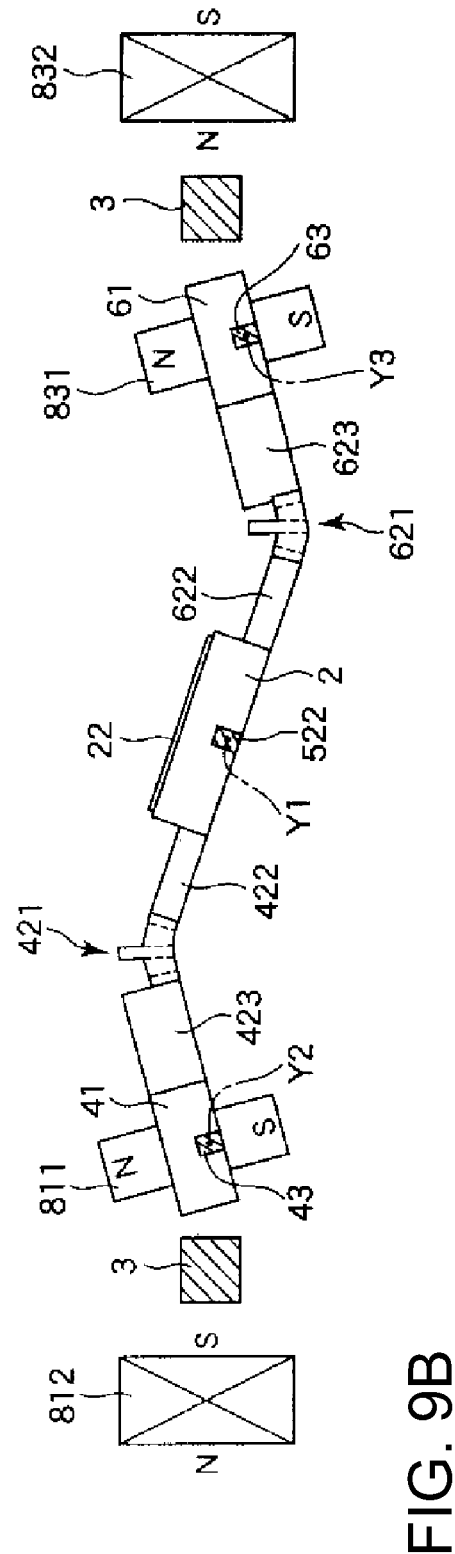
Figure 13:
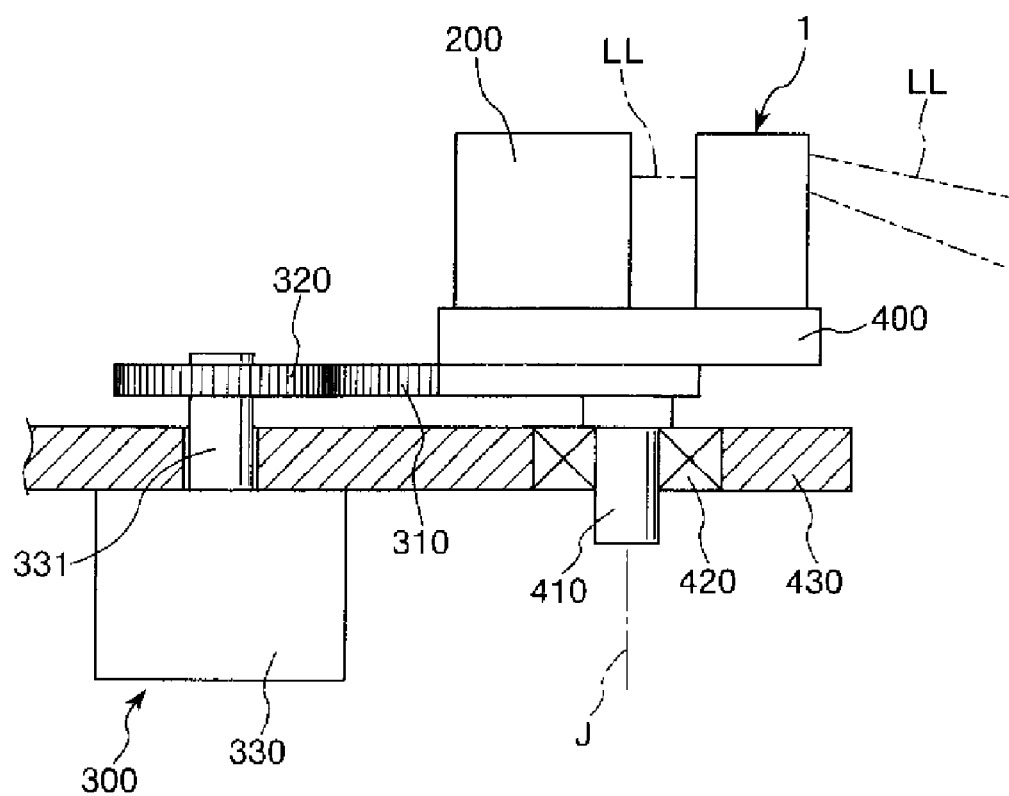
FIG. 13 is a sectional view showing a driving unit of the image forming apparatus shown in FIG. 1.
Figure 15:
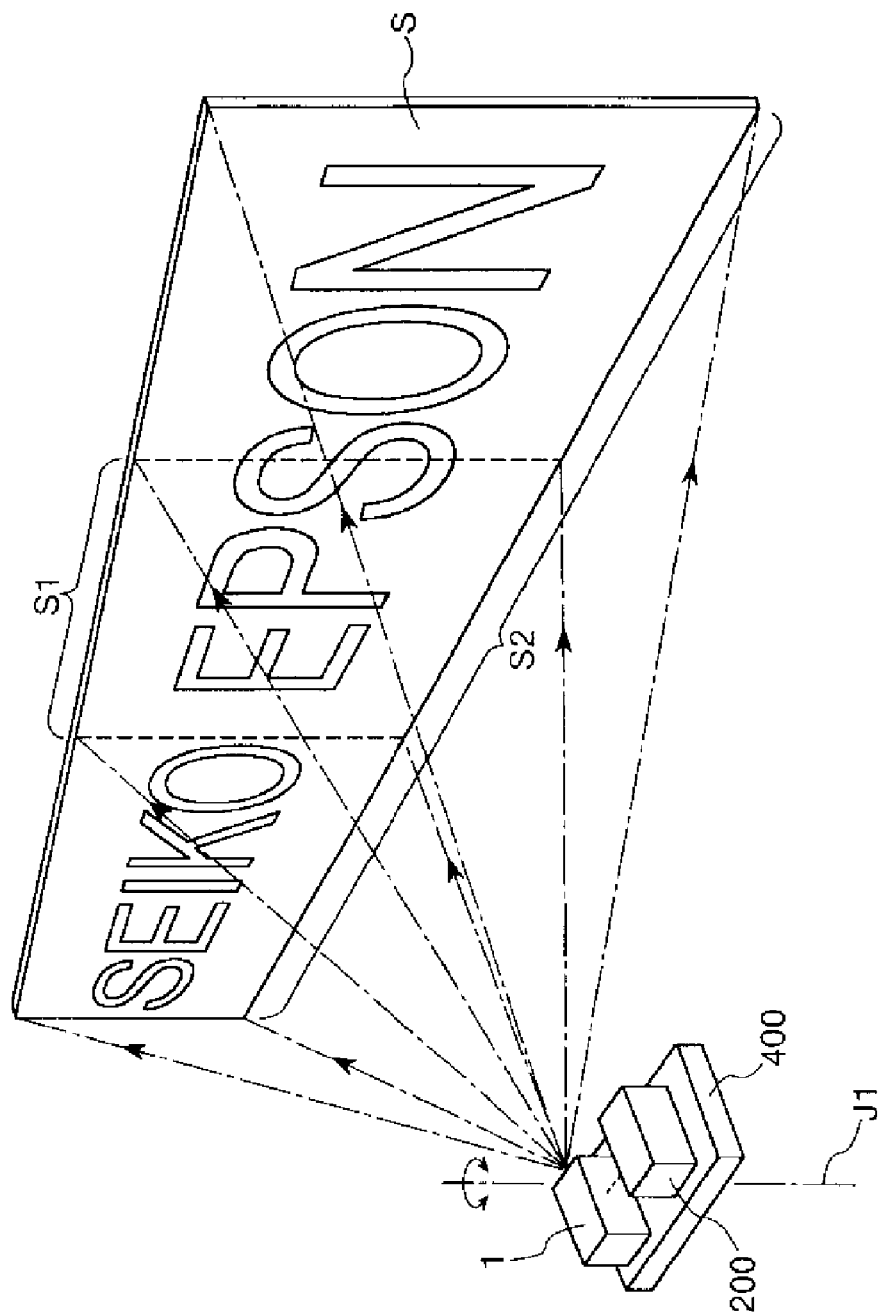
FIG. 15 shows an operation of the image forming apparatus shown in FIG. 1.

FIG. 1 shows the first embodiment of the image forming apparatus of the invention, FIG. 2 shows a schematic configuration of the image forming apparatus shown in FIG. 1, FIG. 3 is a plan view of a light scanner of the image forming apparatus shown in FIG. 1, FIG. 4 is a sectional view of the light scanner shown in FIG. 3 (a sectional view along A-A line in FIG. 3), FIG. 5 is a perspective view of a connection part of the light scanner shown in FIG. 3, FIGS. 6A to 6C and 7A to 7C are sectional views respectively for explanation of a manufacturing method of a vibration system of the light scanner shown in FIG. 3, FIG. 8 is a diagram for explanation of a displacing unit (a displacement providing unit) of the light scanner shown in FIG. 3, FIGS. 9A and 9B are diagrams for explanation of driving of the light scanner shown in FIG. 3, FIGS. 10A, 10B, 11, 12A, and 12B are diagrams respectively for explanation of the driving of the light scanner shown in FIG. 3, FIG. 13 is a sectional view showing a driving unit (a scanner rotating unit) of the image forming apparatus shown in FIG. 1, FIGS. 14A and 14B are diagrams seen from above for explanation of driving of the driving unit shown in FIG. 13, and FIG. 15 shows an operation of the image forming apparatus shown in FIG. 1.

Hereinafter, for convenience of explanation, the left side in FIG. 3 will be referred to as "left" and the right side will be referred to as "right", and the upside in FIGS. 4A to 12B will be referred to as "up" and the downside will be referred to as "down". Further, three axes orthogonal to one another as shown in FIG. 3 will be referred to as "X-axis (first axis)", "Y-axis (second axis)", and "Z-axis", and the plane of a movable plate (a movable unit) in the non-driven state and the plane formed by the X-axis and the Y-axis will coincide (are in parallel) and the thickness direction of the movable plate and the Z-axis will coincide. Further, hereinafter, the direction in parallel to the X-axis will be referred to as "X-axis direction", the direction in parallel to the Y-axis will be referred to as "Y-axis direction", and the direction in parallel to the Z-axis will be referred to as "Z-axis direction".

An image forming apparatus 100 shown in FIG. 1 is an apparatus that displays predetermined images of still images, moving images, or the like on a screen (display target) S installed within a building or outdoor, for example. The image forming apparatus 100 has a light output unit 200 that outputs a laser beam (light), a light scanner 1 that reflects the light output from the light output unit 200, and a driving unit 300 that rotates the light scanner 1 around a predetermined axis line as shown in FIG. 2.

As a constituent material of the screen S, not limited, but, for example, polyethylene, polypropylene, polyvinyl chloride, polystyrene, polyamide, acrylic resin, ABS resin, fluorinated resin, epoxy resin, silicone resin, or copolymers, blends, polymer-alloys, and the like mainly containing them may be cited, and one or two of them may be used in combination. Thereby, visibility of images may be improved. Note that the screen S may be omitted, and, for example, images may be displayed directly on a wall surface or a floor surface of a building.

As below, the respective configurations of the image forming apparatus will sequentially be described in detail.

Light Output Unit 200.

As shown in FIG. 2, the light output unit (light source unit) 200 includes laser light sources 210r, 210g, 210b of the respective colors, and collimator lenses 220r, 220g, 220b and dichroic mirrors 230r, 230g, 230b provided in correspondence with the laser light sources 210r, 210g, 210b of the respective colors.

The laser light sources 210r, 210g, 210b of the respective colors output red, green, and blue laser beams RR, GG, BB, respectively. The laser beams RR, GG, BB are output in modulated states in response to drive signals transmitted from a control unit (not shown), and parallelized by the collimator lenses 220r, 220g, 220b as collimate optical devices into thin beams.

The dichroic mirrors 230r, 230g, 230b have characteristics of reflecting the red laser beam RR, the green laser beam GG, the blue laser beam BB, respectively, and couple the laser beams RR, GG, BB of the respective colors and output one laser beam LL.

Note that, in place of the collimator lenses 220r, 220g, 220b, collimator mirrors may be used, and, in this case, a thin beam with parallel luminous flux may be formed. Further, when parallel luminous fluxes are output from the laser light sources 210r, 210g, 210b of the respective colors, the collimator lenses 220r, 220g, 220b may be omitted. Furthermore, the laser light sources 210r, 210g, 210b may be replaced by light sources such as light emitting diodes that generate the same luminous fluxes. In addition, the order of the laser light sources 210r, 210g, 210b of the respective colors, the collimator lenses 220r, 220g, 220b, and the dichroic mirrors 230r, 230g, 230b is just an example, and the order may be freely set with the combinations of the respective colors (the laser light source 210r, the collimator lens 220r, and the dichroic mirror 230r for red, the laser light source 210g, the collimator lens 220g, and the dichroic mirror 230g for green, and the laser light source 210b, the collimator lens 220b, and the dichroic mirror 230b for blue) held. For example, the combination of blue, red, green in the order closer to the light scanner may be employed.

Light Scanner

Next, the light scanner 1 will be explained.

The light scanner 1 is a device of scanning the surface (display surface) of the screen S with the laser beam LL output from the light source unit 200 using a scanning method of raster scan, vector scan, or the like. Here, the raster scan is a technique of two-dimensional scanning by scanning in the horizontal direction and scanning in the vertical direction with the laser beam LL, and regularly and uniformly scans the entire range of the display surface with the laser beam LL regardless of an image to be displayed on the screen S. On the other hand, the vector scan is a technique of scanning to sequentially form line segments connecting different two points on the surface of the screen S with the laser beam LL, irregularly scans only necessary locations on the display surface with the laser beam LL according to an image to be displayed on the display screen. Note that the light scanner 1 used in the embodiment may perform scanning with the laser beam LL by either of the raster scan or the vector scan, however, in consideration of its configuration, it is preferable to perform scanning with the laser beam LL by the vector scan.

As shown in FIGS. 3 and 4, the light scanner 1 has a vibration system 11 including a movable plate (a movable unit) 2, a support part (a scanner support part) 3 that supports the movable plate 2 and four connection parts 4, 5, 6, 7 connecting the movable plate 2 and the support part 3, a base 12 that supports the vibration system 11, and a displacing unit (a displacement providing unit) 8 that displaces the movable plate 2. As below, the respective configurations of the light scanner 1 will sequentially be explained in detail. Note that the three axes orthogonal to one another will be referred to as "X-axis", "Y-axis", and "Z-axis", and the plane of the movable plate in the non-driven state and the plane formed by the X-axis and the Y-axis will coincide (are in parallel) and the thickness direction of the movable plate and the Z-axis will coincide. Further, hereinafter, the direction in parallel to the X-axis will be referred to as "X-axis direction", the direction in parallel to the Y-axis will be referred to as "Y-axis direction", and the direction in parallel to the Z-axis will be referred to as "Z-axis direction".

Vibration System 11

In the embodiment, the vibration system 11 is integrally formed by removing unnecessary parts of an SOI substrate using various etching methods such as dry etching and wet etching. A manufacturing method of the vibration system 11 will be described later in detail.

The support part 3 has a function of supporting the movable plate 2. The support part 3 has a frame shape and is provided to surround the movable plate 2. Note that the shape of the support part 3 is not particularly limited as long as it may support the movable plate 2, and, for example, a pair of them may be provided to be opposed in the X-axis direction or the Y-axis direction via the movable plate 2.

The movable plate 2 is provided inside of the support part 3. The movable plate 2 has a flat plate shape, and a light reflection part 22 having light reflectivity is formed on one surface (the surface opposite to the base 12) 21. The light reflection part 22 is obtained by forming a metal film of gold, silver, aluminum, or the like on the surface 21 by vapor deposition or the like.

Note that, in the embodiment, the shape of the movable plate 2 in the plan view is circular shape, however, the shape of the movable plate 2 in the plan view is not particularly limited, but may be a polygonal shape such as a rectangular shape and a square shape, an oval shape, or the like, for example.

The movable plate 2 is connected to the support part 3 by the four connection parts 4, 5, 6, 7. The four connection parts 4, 5, 6, 7 are arranged at equal intervals, i.e., at intervals of 90 degrees along the circumferential direction of the movable plate 2 in the plan view of the movable plate 2.

Further, of the four connection parts 4, 5, 6, 7, the connection parts 4, 6 are formed to be opposed in the X-axis direction via the movable plate 2 symmetrically with respect to the movable plate 2, and the connection parts 5, 7 are formed to be opposed in the Y-axis direction via the movable plate 2 symmetrically with respect to the movable plate 2. By supporting the movable plate 2 using the connection parts 4, 5, 6, 7, the movable plate 2 may stably be supported. Furthermore, as will be described later, the rotation around a rotation center axis X1 and the rotation around a rotation center axis Y1 of the movable plate 2 may respectively and independently be performed.

The four connection parts 4, 5, 6, 7 have the same configuration as one another.

Specifically, the connection part (the first connection part) 4 has a drive plate (a drive unit) 41, a first shaft part 42 that connects the drive plate 41 and the movable plate 2, and a pair of second shaft parts 43 that connect the drive plate 41 and the support part 3. Further, the connection part (the third connection part) 5 also has a drive plate 51, a first shaft part 52 that connects the drive plate 51 and the movable plate 2, and a pair of second shaft parts 53 that connect the drive plate 51 and the support part 3. Furthermore, the connection part (the second connection part) 6 also has a drive plate 61, a first shaft part 62 that connects the drive plate 61 and the movable plate 2, and a pair of second shaft parts 63 that connect the drive plate 61 and the support part 3. In addition, the connection part (the fourth connection part) 7 also has a drive plate 71, a first shaft part 72 that connects the drive plate 71 and the movable plate 2, and a pair of second shaft parts 73 that connect the drive plate 71 and the support part 3. Note that, the "same configuration" means that the elements forming the connection parts are common. Therefore, the outer shapes are not necessary the same.

Since the respective connection parts 4, 5, 6, 7 have the configurations, the configurations of the connection parts are simple, and the rotations of the movable plate 2 around the rotation center axes X1, Y1 and the like may smoothly be performed as will be described later.

As below, the connection parts 4, 5, 6, 7 will specifically be explained, and the configurations of the connection parts 4, 5, 6, 7 are the same and the connection part 4 will be representatively explained and the explanation of the other connection parts 5, 6, 7 will be omitted. Note that the connection parts 5, 7 are arranged to be rotated to 90 degrees relative to the connection part 4 in the plan view of the movable plate 2. Accordingly, the connection parts 5, 7 may be explained by replacing "Y-axis direction" by "X-axis direction" and "X-axis direction" by "Y-axis direction" in the following explanation of the connection part 4.

As shown in FIG. 5, the pair of second shaft parts 43 are oppositely arranged in the Y-axis direction via the drive plate 41 and support the drive plate 41 at both ends. Further, the pair of second shaft parts 43 have bar shapes extending in the Y-axis direction. Furthermore, the pair of second shaft parts 43 are torsionally deformable around the center axis. The pair of second shaft parts 43 are coaxially provided and the pair of second shaft parts 43 torsionally deform and the drive plate 41 rotates around the axis (hereinafter, also referred to as "rotation center axis Y2").

The drive plate 41 is provided separately from the movable plate 2 in the X-axis direction. Further, the drive plate 41 is supported at both ends by the pair of second shaft parts 43 as described above. A through hole 411 is formed in the drive plate 41, and a permanent magnet 811 is inserted into the through hole and fixed. The permanent magnet 811 is fixed to the drive plate 41 by fitting (press-fitting) or an adhesive agent. The permanent magnet 811 is apart of the configuration of the displacing unit 8, and it will be explained later.

Further, in the embodiment, the shape of the drive plate 41 in the plan view is a rectangular shape longitudinal in the Y-axis direction. Since the drive plate 41 has the shape, the width (the length in the X-axis direction) of the drive plate 41 may be suppressed while a space for fixing the permanent magnet 811 is secured. By suppressing the width of the drive plate 41, the inertial moment generated when the drive plate 41 rotates around the rotation center axis Y2 may be suppressed, the responsiveness of the drive plate 41 becomes higher, and the faster rotation can be performed. Further, when the responsiveness of the drive plate 41 becomes higher, generation of unwanted vibration due to rotations of the drive plate 41 (particularly at turning around when the rotational direction is switched) may be suppressed. Accordingly, the light scanner 1 may stably be driven.

Note that, the shape of the drive plate 41 in the plan view is not particularly limited, but, for example, may be a polygonal shape such as a square shape, a pentagonal shape, or a polygonal shape with more apexes, or a circular shape.

The drive plate 41 is connected to the movable plate 2 by the first shaft part 42. The first shaft part 42 is provided to extend in the X-axis direction as a whole. The first shaft part 42 includes a stress relaxing portion 421 provided between the drive plate 41 and the movable plate 2, a movable plate side shaft portion 422 that connects the stress relaxing portion 421 and the movable plate 2, and a drive plate side shaft portion (drive unit side shaft portion) 423 that connects the stress relaxing portion 421 and the drive plate 41.

The movable plate side shaft portion 422 and the drive plate side shaft portion 423 respectively have bar shapes extending in the X-axis direction. Further, the movable plate side shaft portion 422 and the drive plate side shaft portion 423 are coaxially provided.

It is preferable that, of these two shaft portions, the drive plate side shaft portion 423 is set to hardness that may not cause great deformation at driving of the light scanner 1, and more preferable that the portion is set to hardness that may not substantially cause deformation. On the other hand, the movable plate side shaft portion 422 is torsionally deformable around its center axis. As described above, since the first shaft part 42 has the hard part that may not substantially deform and the part torsionally deformable and located at the end, as will be described later, the movable plate 2 may stably be rotated around the respective axes of the X-axis and the Y-axis. Note that the "not deform" means that no bending or curving in the Z-axis direction or no torsional deformation around the center axis is substantially caused.

The movable plate side shaft portion 422 and the drive plate side shaft portion 423 are connected via the stress relaxing portion 421. The stress relaxing portion 421 has a function of serving as a point of support when the first shaft part 42 bendingly deforms, and a function of relaxing (absorbing) torque generated by the torsional deformation of the movable plate side shaft portion 422 and preventing or suppressing transmission of the torque to the drive plate side shaft portion 423.

As shown in FIG. 5, the stress relaxing portion 421 has a pair of deforming portions 4211, 4212, a non-deforming portion 4213 provided between them, a pair of connection portions 4214 that connect the deforming portion 4211 to the non-deforming portion 4213, and a pair of connection portions 4215 that connect the deforming portion 4212 to the non-deforming portion 4213.

The non-deforming portion 4213 has a bar shape extending in the Y-axis direction. The non-deforming portion 4213 is set to hardness that may not substantially cause deformation at driving of the light scanner 1. Thereby, as will be described later, the first shaft part 42 may be bent around a center axis Y4 of the non-deforming portion 4213, the stress relaxing portion 421 may be allowed to reliably fulfill the function as the point of support, and the scanner 1 may stably be driven.

The pair of deforming portions 4211, 4212 are symmetrically arranged with respect to the non-deforming portion 4213. The deforming portions 4211, 4212 respectively have bar shapes extending in the Y-axis direction. Further, the deforming portions 4211, 4212 are separately arranged from each other in parallel in the X-axis direction. The deforming portions 4211, 4212 are respectively torsionally deformable around their center axes.

The deforming portion 4211 located at the movable plate 2 side is connected to one end of the movable plate side shaft portion 422 nearly at the center in its longitudinal direction, and is connected to the non-deforming portion 4213 via the pair of connection portions 4214 at its ends. Similarly, the deforming portion 4212 located at the drive plate 41 side is connected to one end of the drive plate side shaft portion 423 nearly at the center in its longitudinal direction, and is connected to the non-deforming portion 4213 via the pair of connection portions 4215 at its ends.

One connection portion of the pair of connection portions 4214 connects one ends of the deforming portion 4211 and the non-deforming portion 4213, and the other connection portion connects the other ends of the deforming portion 4211 and the non-deforming portion 4213. Further, one connection portion of the pair of connection portions 4215 connects one ends of the deforming portion 4212 and the non-deforming portion 4213, and the other connection portion connects the other ends of the deforming portion 4212 and the non-deforming portion 4213.

The respective connection portions 4214, 4215 have bar shapes extending in the X-axis direction. Further, the respective connection portions 4214, 4215 are curvable in the Z-axis direction and torsionally deformable around their center axes.

The configuration of the vibration system 11 has been specifically explained thus far.

As described above, the vibration system 11 having the configuration is integrally formed from an SOI substrate. Thereby, the formation of the vibration system 11 is easier. Specifically, as described above, in the vibration system 11, sections to be positively deformed and sections not to be deformed (undesired to be deformed) are mixed. On the other hand, the SOI substrate is a substrate formed by stacking a first Si layer, an $SiO_2$ layer, and a second Si layer in this order. Accordingly, the sections not to be deformed are formed by all of the three layers and the sections to be positively deformed are formed only by the second Si layer, that is, the thicknesses of the SOI substrate are made different, and thereby, the vibration system 11 in which the sections to be deformed and sections not to be deformed are mixed may easily be formed. Note that the sections to be positively deformed may include two layers of the second Si layer and the $SiO_2$ layer.

The "sections to be deformed" include the second shaft parts 43, 53, 63, 73, the movable plate side shaft portions 422, 522, 622, 722, the deforming portions 4211, 4212, 5211, 5212, 6211, 6212, 7211, 7212, and the connection portions 4214, 4215, 5214, 5215, 6214, 6215, 7214, 7215.

On the other hand, the "sections not to be deformed" include the movable plate 2, the support part 3, the drive plates 41, 51, 61, 71, the drive plate side shaft portions 423, 523, 623, 723, and the non-deforming portions 4213, 5213, 6213, 7213.

As below, an example of a manufacturing method of the vibration system 11 will briefly be explained with reference to FIGS. 6A to 7C. Note that FIGS. 6A to 7C are sectional views corresponding to the sectional view along A-A line in FIG. 3. Further, the manufacturing method of the vibration system 11 is not limited to that.

Figure 6A:
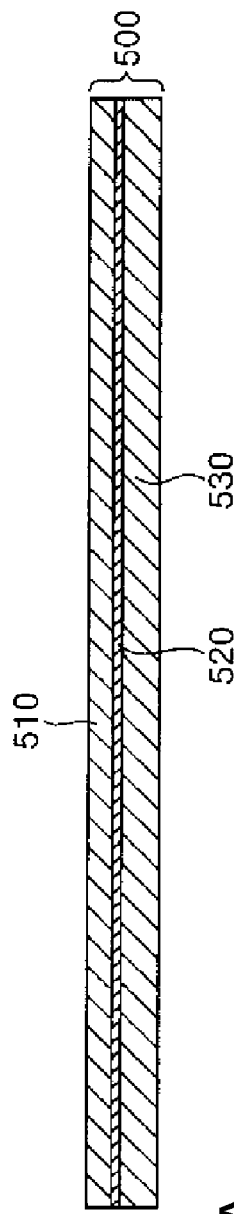
FIGS. 6A to 6C are sectional views for explanation of a manufacturing method of a vibration system of the light scanner shown in FIG. 3.

First, as shown in FIG. 6A, an SOI substrate (silicon substrate) 500 having a first Si layer 510, an $SiO_2$ layer 520, and a second Si layer 530 stacked from the top in this order is prepared.

Figure 6B:
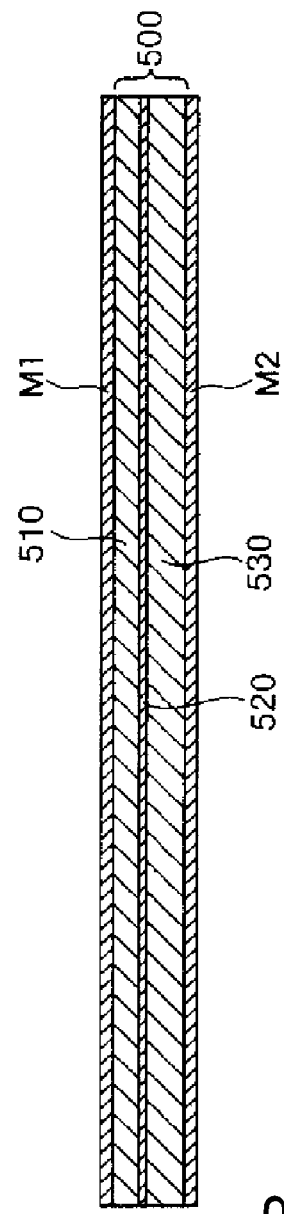
Figure 6C:
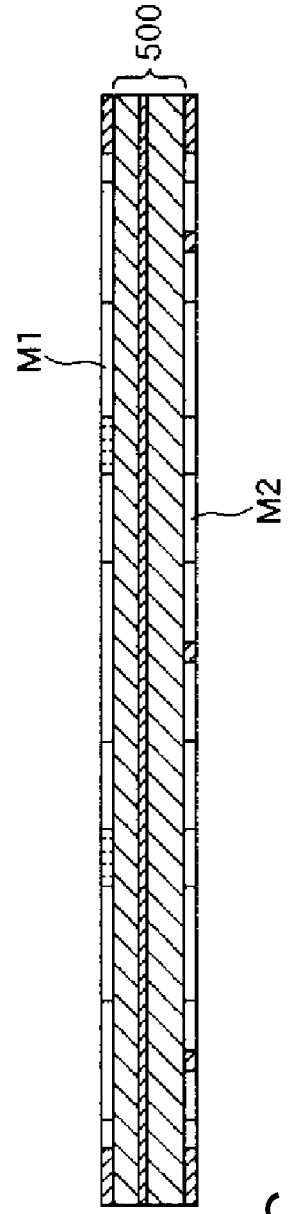

Then, as shown in FIG. 6B, $SiO_2$ membranes M1, M2 are formed on both sides of the SOI substrate 500. Then, as shown in FIG. 6C, patterning in the shapes of the movable plate 2, the support part 3, and the connection parts 4, 5, 6, 7 in the plan view is performed by etching the $SiO_2$ membrane M2, and patterning in the shapes corresponding to the movable plate 2, the support part 3, the drive plates 41, 51, 61, 71, the drive plate side shaft portions 423, 523, 623, 723, and the non-deforming portions 4213, 5213, 6213, 7213 is performed by etching the $SiO_2$ membrane M1.

Then, as shown in FIG. 7A, the SOI substrate 500 is etched via the $SiO_2$ membrane M1. In this regard, the $SiO_2$ layer 520 as an intermediate layer of the SOI substrate 500 functions as a stop layer of the etching. After the etching ends, in turn, the SOI substrate 500 is etched via the $SiO_2$ membrane M2. In this regard, the $SiO_2$ layer 520 as the intermediate layer of the SOI substrate 500 also functions as a stop layer of the etching.

Note that the etching method is not particularly limited, but, for example, one or some of physical etching methods such as plasma etching, reactive ion etching, beam etching, and laser-assisted etching, chemical etching methods such as wet etching, and the like may be used in combination. In the etching at the following respective steps, the same method may be used.

Then, as shown in FIG. 7B, the exposed parts of the $SiO_2$ membranes M1, M2 and the $SiO_2$ layer 520 are removed by etching using BFH (buffered hydrofluoric acid) or the like, and thereby, the outer shapes of the movable plate 2, the support part 3, and the connection parts 4, 5, 6, 7 are processed.

Further, as shown in FIG. 7C, a metal film is formed on the upper surface 21 of the movable plate 2, and the light reflection part 22 is formed. As a forming method of the metal film (light reflection part 22), a dry plating method such as vacuum evaporation, sputtering (low-temperature sputtering), or ion plating, wet plating such as electrolytic plating, or non-electrolytic plating, thermal spraying, bonding of a metal foil, or the like may be cited.

In the above described manner, the vibration system 11 is obtained.

Base 12

As shown in FIG. 4, the base 12 has a flat plate-like base part 121 and a frame part 122 provided along the edge of the base part 121, and has a box shape (without a lid). The base 12 is bonded to the lower surface of the support part 3 of the vibration system 11 in the frame part 122. Thereby, the vibration system 11 is supported by the base 12. The base 12 includes glass and silicon as main materials, for example. Note that the bonding method of the base 12 and the support part 3 is not particularly limited, but, for example, they may be bonded using an adhesive agent, or various bonding methods such as anodic bonding may be used.

Displacing Unit 8

As shown in FIG. 3, the displacing unit 8 includes a first displacement part 81 having the permanent magnet 811, a coil 812, and a power supply 813, a second displacement part 82 having a permanent magnet 821, a coil 822, and a power supply 823, a third displacement part 83 having a permanent magnet 831, a coil 832, and a power supply 833, and a fourth displacement part 84 having a permanent magnet 841, a coil 842, and a power supply 843.

Further, the first displacement part 81 is provided in correspondence with the connection part 4, the second displacement part 82 is provided in correspondence with the connection part 5, the third displacement part 83 is provided in correspondence with the connection part 6, and the fourth displacement part 84 is provided in correspondence with the connection part 7.

According to the configuration, the configuration of the displacing unit 8 is simple. Further, since the displacing unit 8 is electromagnetically driven, the greater power may be generated and the movable plate 2 may be rotated more reliably. Furthermore, since one displacing part is formed for each of the connection parts 4, 5, 6, 7, the respective connection parts 4, 5, 6, 7 may independently be deformed. Accordingly, as will be described later, the movable plate 2 may be displaced in various modes.

As below, the first displacement part 81, the second displacement part 82, the third displacement part 83, and the fourth displacement part 84 will be explained, and they have the same configuration, and the first displacement part 81 will be representatively explained and the explanation of the second displacement part 82, the third displacement part 83, and the fourth displacement part 84 will be omitted as below. Note that the second displacement part 82 and the fourth displacement part 84 are arranged to be rotated to 90 degrees relative to the first displacement part 81 in the plan view of the movable plate 2. Accordingly, the second displacement part 82 and the fourth displacement part 84 may be explained by replacing "Y-axis direction" by "X-axis direction" and "X-axis direction" by "Y-axis direction" in the following explanation of the first displacement part 81.

As shown in FIG. 8, the permanent magnet 811 has a bar shape and is magnetized in its longitudinal direction. That is, the permanent magnet 811 has one end side in the longitudinal direction as the S-pole and the other end side as the N-pole. The permanent magnet 811 is inserted into the through hole 411 of the drive plate 41 and fixed to the drive plate 41 nearly at the center in the longitudinal direction. Further, the permanent magnet 811 projects upward and downward from the drive plate 41 by the same length, and the S-pole and the N-pole are opposed via the drive plate 41 (the rotation center axis Y2). Thereby, as will be described later, the movable plate 2 may stably be displaced.

Furthermore, the permanent magnet 811 is provided with its longitudinal direction orthogonal to the planar direction of the drive plate 41. In addition, the permanent magnet 811 is provided with its center axis intersecting with the rotation center axis Y2.

The permanent magnet 811 is not particularly limited, but, for example, a magnetized hard magnetic material such as neodymium magnet, ferrite magnet, samarium-cobalt magnet, alnico magnet, bond magnet, or the like may preferably be used.

Note that, in the embodiment, the permanent magnet 811 has a bar shape, however, the shape of the permanent magnet is not particularly limited and, for example, may be a plate shape. In this case, the permanent magnet 811 may be magnetized in the planar direction and fixed to the drive plate 41 so that the planar direction may be orthogonal to the X-axis direction. Thereby, the length of the permanent magnet 811 in the X-axis direction may be made shorter, and the inertia moment generated with the rotation of the drive plate 41 may be suppressed.

The coil 812 generates a magnetic field acting on the permanent magnet 811. The coil 812 is provided near the outside of the vibration system 11 to be opposed to the permanent magnet 811 in the X-axis direction. Further, the coil 812 is provided to generate the magnetic field in the X-axis direction, that is, to generate a state in which the permanent magnet 811 side of the coil 812 is the N-pole and the opposite side is the S-pole and a state in which the permanent magnet 811 side of the coil 812 is the S-pole and the opposite side is the N-pole.

The light scanner 1 of the embodiment has a coil fixing part 85 fixedly provided to the base 12 outside of the vibration system 11, and the coil 812 is wound around a projection portion 851 extending in the X-axis direction of the coil fixing part 85. According to the configuration, the coil 812 may be fixed relative to the vibration system 11, and the above described magnetic field may easily be generated. Further, by forming the projection portion 851 using a soft magnetic material such as iron, the projection portion 851 may be used as a core of the coil 812, and the above described magnetic field may be generated more efficiently.

The power supply 813 is electrically connected to the coil 812. Further, by applying a desired voltage from the power supply 813 to the coil 812, the above described magnetic field may be generated from the coil 812. In the embodiment, the power supply 813 may select an alternating voltage and a direct-current voltage for application. Further, when an alternating voltage is applied, its strength and frequency may be changed, and an offset voltage (direct-current voltage) may be superimposed thereon.

The configuration of the light scanner 1 has been explained thus far. Next, an operation of the light scanner 1 will be explained.

In the light scanner 1 having the above described configuration, at least a pattern of rotating the movable plate 2, a pattern of vibrating the movable plate 2, and a pattern of allowing the movable plate 2 to stand still in a predetermined position may be selected. An advantage that light scanner 1 may be driven in various patterns is obtained by bendingly deforming the first shaft parts 42, 52, 62, 72 of the respective connection parts 4, 5, 6, 7 as will be described later.

As below, these three patterns will sequentially be explained. Note that a configuration in which all of the permanent magnets 811, 821, 831, 841 are provided with the N-poles upside will representatively be explained as below for convenience of explanation.

Rotation

Rotation Around Y-Axis

The rotation of the movable plate 2 around the Y-axis will be explained with reference to FIGS. 9A and 9B. FIGS. 9A and 9B are sectional views corresponding to the sectional view along A-A line in FIG. 3.

First, alternating voltages are applied from the power supplies 813, 833 to the coils 812, 832 to alternately and periodically switch between the first state in which the permanent magnet 811 side of the coil 812 is the N-pole and the permanent magnet 831 side of the coil 832 is the S-pole and the second state in which the permanent magnet 811 side of the coil 812 is the S-pole and the permanent magnet 831 side of the coil 832 is the N-pole. It is preferable that the alternating voltages applied from the power supplies 813, 833 to the coils 812, 832 have the same waveform with each other (the same strength and frequency).

In the first state shown in FIG. 9A, the S-pole of the permanent magnet 811 is attracted to the coil 812 and the N-pole moves away from the coil 812, and thus, while the pair of second shaft parts 43 are torsionally deformed, the drive plate 41 tilts around the rotation center axis Y2 with its upper surface directed toward the movable plate 2. Concurrently, the N-pole of the permanent magnet 831 is attracted to the coil 832 and the S-pole moves away from the coil 832, and thus, while the pair of second shaft parts 63 are torsionally deformed, the drive plate 61 tilts around the rotation center axis Y3 with its lower surface directed toward the movable plate 2. That is, both of the drive plates 41, 61 tilt clockwise in FIG. 9A.

With the tilts of the drive plates 41, 61, the drive plate side shaft portion 423 tilts to direct its end at the movable plate 2 side downward and the drive plate side shaft portion 623 tilts to direct its end at the movable plate 2 side upward. Thereby, the ends of the drive plate side shaft portions 423, 623 at the movable plate 2 side are shifted in the Z-axis direction.

Further, when the ends of the drive plate side shaft portions 423, 623 at the movable plate 2 side are shifted in the Z-axis direction, while the deforming portions 4211, 4212, 6211, 6212 are torsionally deformed around their center axes and the respective connection portions 4214, 4215, 6214, 6215 are bendingly deformed, the movable plate side shaft portions 422, 622 and the movable plate 2 integrally tilt counter-clockwise in FIG. 9A.

In this manner, in the first state, the first shaft part 42 of the connection part 4 bendingly deforms into a V-shape convex downward (first deformation) in the stress relaxing portion 421 located in the middle thereof, the first shaft part 62 of the connection part 6 bendingly deforms into a V-shape convex upward (second deformation) in the stress relaxing portion 621 located in the middle thereof, and thereby, the movable plate 2 tilts around the rotation center axis Y1 counter-clockwise in FIG. 9A.

On the other hand, in the second state shown in FIG. 9B, the opposite deformations to those in the above described first state occur. That is, in the second state, the first shaft part 42 of the connection part 4 bendingly deforms into the V-shape convex upward (second deformation) in the stress relaxing portion 421, and the first shaft part 62 of the connection part 6 bendingly deforms into the V-shape convex downward (first deformation) in the stress relaxing portion 621. Thereby, the movable plate 2 tilts around the rotation center axis Y1 counter-clockwise in FIG. 9B.

By alternately and periodically switching between those first state and second state, the movable plate 2 may be rotated around the rotation center axis Y1. Note that the rotation of the movable plate 2 around the rotation center axis Y1 is allowed by the torsional deformations of the movable plate side shaft portions 522, 722 of the connection parts 5, 7 around their center axes.

Note that the frequencies of the alternating voltages applied to the coils 812, 832 are not particularly limited and may be equal to or different from the resonance frequency of the vibration system including the movable plate 2 and the connection parts 4, 5, 6, 7, and may preferably be different from the resonance frequency. That is, it is preferable that the light scanner 1 is driven in a non-resonant manner. Thereby, the light scanner 1 can be driven more stably.

Rotation Around X-Axis

Next, the rotation of the movable plate 2 around the X-axis will be explained with reference to FIGS. 10A and 10B. FIGS. 10A and 10B are sectional views corresponding to the sectional view along B-B line in FIG. 3.

First, alternating voltages are applied from the power supplies 823, 843 to the coils 822, 842 to alternately and periodically switch between the first state in which the permanent magnet 821 side of the coil 822 is the N-pole and the permanent magnet 841 side of the coil 842 is the S-pole and the second state in which the permanent magnet 821 side of the coil 822 is the S-pole and the permanent magnet 841 side of the coil 842 is the N-pole. It is preferable that the alternating voltages applied from power supplies 823, 843 to the coils 822, 842 have the same waveform with each other.

Like the above described rotation of the movable plate 2 around the rotation center axis Y1, in the first state shown in FIG. 10A, the first shaft part 52 of the connection part 5 bendingly deforms into the V-shape convex downward (first deformation) in the stress relaxing portion 521 located in the middle thereof, the first shaft part 72 of the connection part 7 bendingly deforms into the V-shape convex upward (second deformation) in the stress relaxing portion 721 located in the middle thereof, and thereby, the movable plate 2 tilts around the rotation center axis X1 counter-clockwise in FIG. 10A.

On the other hand, in the second state shown in FIG. 10B, the opposite deformations to those in the above described first state occur. That is, in the second state, the first shaft part 52 of the connection part 5 bendingly deforms into the V-shape convex upward (second deformation) in the stress relaxing portion 521, the first shaft part 72 of the connection part 7 bendingly deforms into the V-shape convex downward (first deformation) in the stress relaxing portion 721, and thereby, the movable plate 2 tilts around the rotation center axis X1 counter-clockwise in FIG. 10B.

By alternately and periodically switching between those first state and second state, the movable plate 2 may be rotated around the rotation center axis X1. Note that the rotation of the movable plate 2 around the rotation center axis X1 is allowed by the torsional deformations of the movable plate side shaft portions 422, 622 of the connection parts 4, 6 around their center axes.

Note that the frequencies of the alternating voltages applied to the coils 822, 842 are not particularly limited and may be equal to or different from the resonance frequency of the vibration system including the movable plate 2 and the connection parts 4, 5, 6, 7, and may preferably be different from the resonance frequency. That is, it is preferable that the light scanner 1 is driven in a non-resonant manner. Thereby, the light scanner 1 can be driven more stably.

Rotations Around Respective Axes of X-Axis and Y-Axis

By simultaneously and independently performing the above described rotation around X-axis and rotation around Y-axis, the movable plate 2 may two-dimensionally be rotated around the respective axes of the rotation center axis Y1 and the rotation center axis X1. As described above, the rotation of the movable plate 2 around the rotation center axis Y1 is allowed by the torsional deformations of the movable plate side shaft portions 522, 722 around their center axes and the rotation of the movable plate 2 around the rotation center axis X1 is allowed by the torsional deformations of the movable plate side shaft portions 422, 622 around their center axes.

In the rotations around the respective axes of the X-axis and the Y-axis, the frequencies of the alternating voltages applied to the coils 812, 822, 832, 842 are not particularly limited and may be equal to or different from the resonance frequency of the vibration system including the movable plate 2 and the connection parts 4, 5, 6, 7, and may preferably be different from the resonance frequency. That is, it is preferable that the light scanner 1 is driven in a non-resonant manner. Thereby, the light scanner 1 can be driven more stably.

Further, the frequencies of the alternating voltages applied to the coils 812, 832 for rotating the movable plate 2 around the rotation center axis Y1 and the frequencies of the alternating voltages applied to the coils 822, 842 for rotating the movable plate 2 around the rotation center axis X1 may be equal or different. For example, in the case where it is desired to rotate the movable plate 2 around rotation center axis Y1 faster than the rotation around the rotation center axis X1, the frequencies of the alternating voltages applied to the coils 812, 832 may be set higher than the frequencies of the alternating voltages applied to the coils 822, 842.

Furthermore, the strengths of the alternating voltages applied to the coils 812, 832 and the strengths of the alternating voltages applied to the coils 822, 842 may be equal or different. For example, in the case where it is desired to rotate the movable plate 2 around rotation center axis Y1 greater than the rotation around the rotation center axis X1, the strengths of the alternating voltages applied to the coils 812, 832 may be set higher than the strengths of the alternating voltages applied to the coils 822, 842.

The driving method of applying the alternating voltages to the coils 812, 822, 832, 842 has been explained, and the movable plate 2 may be rotated by the following driving method. That is, positive (+) or negative (−) offset voltages (direct-current voltages) may be superimposed on the alternating voltages applied from the power supplies 813, 823, 833, 843 to the coils 812, 822, 832, 842. In other words, the strengths with which the N-poles of the permanent magnets 811, 821, 831, 841 are attracted to the coils 812, 822, 832, 842 (hereinafter, also simply referred to as "N-pole attraction strengths") and the strengths with which the S-poles of the permanent magnets 811, 821, 831, 841 are attracted to the coils 812, 822, 832, 842 (hereinafter, also simply referred to as "S-pole attraction strengths") may be differentiated.

Though specific explanation will be later, the above described state in which the N-pole attraction strengths and the S-pole attraction strengths are equal is referred to as "normal state".

Figure 11:
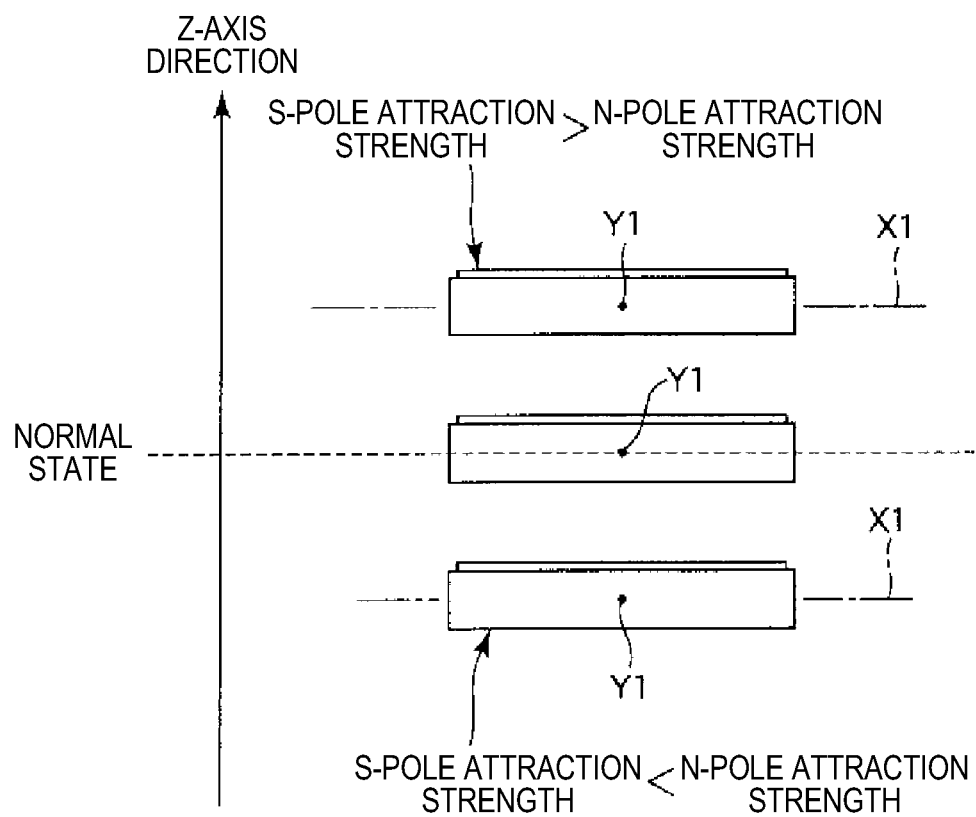
FIG. 11 is a diagram for explanation of the driving of the light scanner shown in FIG. 3.

In the case where the S-pole attraction strengths of the coils 812, 822, 832, 842 are greater than the N-pole attraction strengths, the top dead points and the bottom dead points (points at which the rotational directions are switched) of the rotations of the drive plates 41, 51, 61, 71 shift to the upper side compared to those in the normal state. As a result, as shown in FIG. 11, the rotation center axes X1, Y1 of the movable plate 2 shift to the upper side compared to those in the normal state. Contrary, in the case where the S-pole attraction strengths of the coils 812, 822, 832, 842 are weaker than the N-pole attraction strengths, the top dead points and the bottom dead points of the rotations of the drive plates 41, 51, 61, 71 respectively shift to the lower side compared to those in the normal state, and the rotation center axes X1, Y1 of the movable plate 2 shift to the lower side compared to those in the normal state.

As described above, by superimposing the offset voltages on the alternating voltages applied from the power supplies 813, 823, 833, 843 to the coils 812, 822, 832, 842, the rotation center axes X1, Y1 of the movable plate 2 may be shifted in the Z-axis direction. Thereby, for example, in the image forming apparatus 100, even after assembly of the image forming apparatus 100, the optical path length of the laser beam LL output from the light source unit 200 to the movable plate 2 may be adjusted. At assembly of the image forming apparatus 100, positioning of the light source unit 200 and the movable plate 2 is precisely performed, and, even if their positions are shifted relative to the set values, the positions of the light source unit 200 and the movable plate 2 may be corrected after assembly.

Vibration

First, the alternating voltages are applied from the power supplies 813, 823, 833, 843 to the coils 812, 822, 832, 842 to alternately and periodically switch between the first state in which the respective permanent magnet 811, 821, 831, 841 sides of the coils 812, 822, 832, 842 are the N-pole and the second state in which the permanent magnet 811, 821, 831, 841 sides of the coils 812, 822, 832, 842 are the S-pole. It is preferable that the alternating voltages applied from the power supplies 813, 823, 833, 843 to the coils 812, 822, 832, 842 have the same waveform with one another.

In the first state shown in FIG. 12A, as is the case of the above described rotations, the drive plates 41, 51, 61, 71 respectively tilt around the rotation center axes Y2, X2, Y3, X3 with their upper surfaces directed toward the movable plate 2. With the tilts of the drive plates 41, 51, 61, 71, the drive plate side shaft portions 423, 523, 623, 723 respectively tilt to direct their ends at the movable plate 2 side downward. Thereby, the first shaft parts 42, 52, 62, 72 bend in the stress relaxing portions 421, 521, 621, 721, and, at the same time, the movable plate side shaft portions 422, 522, 622, 722 and the movable plate 2 integrally move downward while keeping the attitude (i.e., planar direction) of the movable plate 2 constant.

On the other hand, in the second state shown in FIG. 12B, the drive plates 41, 51, 61, 71 respectively tilt around the rotation center axes Y2, X2, Y3, X3 with their lower surfaces directed toward the movable plate 2. With the tilts of the drive plates 41, 51, 61, 71, the drive plate side shaft portions 423, 523, 623, 723 respectively tilt to direct their ends at the movable plate 2 side upward. Thereby, the first shaft parts 42, 52, 62, 72 bend in the stress relaxing portions 421, 521, 621, 721, and, at the same time, the movable plate side shaft portions 422, 522, 622, 722 and the movable plate 2 integrally move upward while keeping the attitude (i.e., planar direction) of the movable plate 2 constant.

By alternately switching between the first state and the second state, the movable plate 2 may be vibrated in the Z-axis direction while its attitude is kept, that is, the surface of the light reflection part 22 is kept in parallel to the X-Y plane.

Note that the frequencies of the alternating voltages applied to the coils 812, 822, 832, 842 are not particularly limited and may be equal to or different from the resonance frequency of the vibration system including the movable plate 2 and the connection parts 4, 5, 6, 7, and may preferably be equal to the resonance frequency. That is, it is preferable that the light scanner 1 is driven in a resonant manner. Thereby, the light scanner 1 can be driven more stably.

Even using the vibration pattern, like the above described rotation pattern, by superimposing offset voltages to the alternating voltages applied to the coils 812, 822, 832, 842, the movable plate 2 may be shifted in the Z-axis direction from the natural state and vibrated.

Standing Still

For example, direct-current voltages are applied from the power supplies 813, 823, 833, 843 to the coils 812, 822, 832, 842 so that the respective permanent magnet 811, 821, 831, 841 sides of the coils 812, 822, 832, 842 may be the N-poles. It is preferable that the direct-current voltages applied from the power supplies 813, 823, 833, 843 to the coils 812, 822, 832, 842 have the same strength. By applying the voltages to the coils 812, 822, 832, 842, the movable plate 2 stands still in a state as shown in FIG. 12A.

Contrary, when direct-current voltages are applied from the power supplies 813, 823, 833, 843 to the coils 812, 822, 832, 842 so that the respective permanent magnet 811, 821, 831, 841 sides of the coils 812, 822, 832, 842 may be the S-poles, the movable plate 2 stands still in a state as shown in FIG. 12B.

As described above, the movable plate 2 may be maintained in the position different from that in the natural state.

According to the driving, for example, since the optical path of the laser beam LL reflected by the light reflection part 22 may be shifted relative to that in the natural state, the driving is particularly advantageous when the light scanner 1 is used as a light switch, for example.

Further, for example, in the image forming apparatus 100, in the case where the output of the laser beam LL to the outside of the apparatus should be stopped on the reason that an abnormal laser beam LL is output from the light source unit 200 or the like, by retracting the movable plate 2 to the position different from that in the natural state (the position that does not intersect with the optical path of the laser beam LL), the reflection of the laser beam LL by the light reflection part 22 may be prevented. Thereby, the output of the laser beam LL to the outside of the apparatus may be prevented. Further, the output of the laser beam LL to the outside of the apparatus may be prevented by changing the optical path of the laser beam LL reflected by the light reflection part 22 by displacing the movable plate 2. Thereby, any safety mechanism for solving the problems may not separately be incorporated, and the manufacturing process of the image forming apparatus 100 may be simplified and the manufacturing cost may be reduced.

By using the stand-still driving of the movable plate 2 to differentiate the strengths of the direct-current voltages applied to the coils 812, 822, 832, 842 from one another, the movable plate 2 may be maintained tilted relative to the natural state. Further, by independently changing the strengths of the direct-current voltages applied to the coils 812, 822, 832, 842 over time, the movable plate 2 may continuously or gradually be displaced in an irregular manner. The driving method is effective when scanning with the laser beam LL is performed by vector scan.

The driving of the light scanner 1 has been explained detail thus far.

In the light scanner 1, the rotations of the movable plate 2 around the rotation center axis Y1 and around the rotation center axis X1 may be performed using the same mechanism. Further, in the light scanner 1, the rotations of the movable plate 2 around the rotation center axis Y1 and around the rotation center axis X1 may independently be performed. That is, in the light scanner 1, the rotation around the rotation center axis Y1 is not affected by the rotation around the rotation center axis X1, and oppositely, the rotation around the rotation center axis X1 is not affected by the rotation around the rotation center axis Y1. Accordingly, according to the light scanner 1, the movable plate 2 may stably be rotated around the respective axes of the rotation center axis Y1 and the rotation center axis X1.

Further, as described above, in the light scanner 1, the rotation of the movable plate 2 around the rotation center axis Y1 is allowed by the torsional deformations of the movable plate side shaft portions 522, 722 around their center axes, the rotation of the movable plate 2 around the rotation center axis X1 is allowed by the torsional deformations of the movable plate side shaft portions 422, 622 around their center axes. Thus, since the respective connection parts 4, 5, 6, 7 have the movable plate side shaft portions 422, 522, 622, 722 that are torsionally deformable around their center axes, the movable plate 2 may smoothly be rotated around the respective axes of the rotation center axes Y1, X1.

Furthermore, in the light scanner 1, since the movable plate side shaft portions 422, 522, 622, 722 are directly connected to the movable plate 2, the movable plate 2 may be rotated around the respective axes of the rotation center axes Y1, X1 and vibrated in the Z-axis direction more smoothly.

Further, in the light scanner 1, in the connection part 4, the stress relaxing portion 421 is provided between the movable plate side shaft portion 422 to be torsionally deformed as described above and the drive plate side shaft portion 423 undesired to be deformed. Accordingly, the stresses generated by the above described torsional deformation are absorbed and relaxed by the deformations of the deforming portions 4211, 4212 and the connection portions 4214, 4215 of the stress relaxing portion 421 and not transmitted to the drive plate side shaft portion 423. That is, by providing the stress relaxing portion 421, the drive plate side shaft portion 423 may reliably be prevented from torsionally deforming around its center axis during the rotation of the movable plate 2. This is applicable to the other connection parts 5, 6, 7 than the connection part 4. Accordingly, the movable plate 2 may smoothly be rotated around the respective axes of the rotation center axes Y1, X1.

Furthermore, breakage of the respective drive plate side shaft portions 423, 523, 623, 723 may effectively be prevented. That is, it has technically been clear that, in the bar-like member, break strength when the stress in the Z-axis direction is applied from the natural state is lower than the break strength when the stress in the Z-axis direction is applied from that state in which the torsional deformation around the center axis is generated. Accordingly, as described above, by providing the stress relaxing portions 421, 521, 621, 721 to generate no torsional deformations in the drive plate side shaft portions 423, 523, 623, 723, the breakage of the drive plate side shaft portions 423, 523, 623, 723 may effectively be prevented.

Further, in the connection part 4, the drive plate side shaft portion 423 does not substantially deform, the stress generated by the rotation of the drive plate 41 may effectively be used for the rotation of the movable plate 2. This is applicable to the connection parts 5, 6, 7. Accordingly, the movable plate 2 may be rotated at a large rotation angle with power-saving, or vibrated with a large amplitude in the Z-axis direction.

Furthermore, in the connection part 4, since the stress relaxing portion 421 has the non-deforming portion 4213, the first shaft part 42 may be bent with the non-deforming portion 4213 as an axis. This is applicable to the connection parts 5, 6, 7. Accordingly, the first shaft parts 42, 52, 62, 72 of the respective connection parts 4, 5, 6, 7 may easily and reliably be bent and the movable plate 2 may stably be rotated or vibrated.

Further, in the connection part 4, the stress relaxing portion 421 has the deforming portion 4211 connected to the movable plate side shaft portion 422 and the deforming portion 4212 connected to the drive plate side shaft portion 423, and, when the first shaft part 42 bends, the stress generated by the bending may effectively be relaxed due to the torsional deformations of the deforming portions 4211, 4212 around their center axes. This is applicable to the connection parts 5, 6, 7. Accordingly, the first shaft parts 42, 52, 62, 72 of the respective connection parts 4, 5, 6, 7 may reliably be bent and breakage of the first shaft parts 42, 52, 62, 72 may be prevented. That is, the light scanner 1 may stably be driven.

Furthermore, in the connection part 4, since the stress relaxing portion 421 has the pair of deforming portions 4211, 4212, the following effects may be exerted. That is, for example, thermal expansion of the movable plate side shaft portion 422 and the drive plate side shaft portion 423 due to heat generated by the coil 812 due to energization, heat generated by the laser beam. LL applied to the light reflection part 22, or the like may be allowed by the deformations of the deforming portions 4211, 4212. This is applicable to the connection parts 5, 6, 7. Accordingly, the light scanner 1 may prevent or suppress the stresses left in the vibration system 11, and may exert predetermined vibration characteristics regardless of the temperature.

Here, returning to the explanation of the configuration of the light scanner 1, regarding the connection parts 4, 6, given that the respective separation distance between the rotation center axis Y1 and the center axis Y4 of the non-deforming portion 4213 and separation distance between the rotation center axis Y1 and the center axis Y5 of the non-deforming portion 6213 are L1, and the respective separation distance between the center axis Y4 and the rotation center axis Y2 and separation distance between the center axis Y5 and the rotation center axis Y3 are L2, the magnitude relation between L1 and L2 is not particularly limited, and a relation L1>L2 may be satisfied, a relation L1=L2 may be satisfied, or a relation L1<L2 may be satisfied.

In the case where L1=L2, when the movable plate 2 is rotated around the rotation center axis Y1, that is, when the first shaft part 42 bends, the tilt of the movable plate side shaft portion 422 and the tilt of the drive plate side shaft portion 423 relative to the X-axis are equal. Accordingly, in this case, nearly equal torque is applied to the pair of deforming portions 4211, 4212 of the stress relaxing portion 421. Further, the rotation angle of the drive plate 41 and the rotation angle of the movable plate 2 are nearly equal. This is applicable to the first shaft part 62 of the connection part 6. Therefore, the first shaft parts 42, 62 may efficiently be bent and the rotation angle of the movable plate 2 may easily be controlled, and thus, the movable plate 2 may stably be rotated around the rotation center axis Y1 or the like.

Further, in the case where L1=L2, as described above, since the nearly equal torque is applied to the deforming portions 4211, 4212, it is preferable that the deforming portions 4211, 4212 are formed in the same shape to exhibit the same physical characteristic (ease of torsional deformation). Thereby, excessive torsion of one of the deforming portions 4211, 4212, or contrary, insufficient torsion of one of them may be prevented, and the first shaft part 42 may smoothly be bent. This is applicable to the connection part 6.

In the case where L1>L2, the rotation angle of the movable plate 2 is smaller than in the case where L1=L2, and the attitude of the movable plate 2 may be controlled with more accuracy. That is, in this case, the tilt of the movable plate side shaft portion 422 relative to the X-axis when the first shaft part 42 bends is smaller than the tilt of the drive plate side shaft portion 423. This is applicable to the connection part 6. Accordingly, the rotation angle of the movable plate 2 is smaller relative to the rotation angles of the drive plates 41, 61. Thereby, the rotation angle of the movable plate 2 and the tilt at standing still may be controlled with high accuracy.

Further, in the case where L1>L2, as described above, since the tilt of the drive plate side shaft portion 423 relative to the X-axis when the first shaft part 42 bends is larger than the tilt of the movable plate side shaft portion 422, the torque applied to the deforming portion 4212 is larger than the torque applied to the deforming portion 4211. Therefore, in this case, it is preferable that the deforming portion 4212 is formed to be easier to be torsionally deformed than the deforming portion 4211. Specifically, for example, it is preferable that the width of the deforming portion 4212 is smaller than the width of the torsional deforming portion 4211. This is because the connection part 4 is formed by etching the SOI substrate 500 in its thickness direction as described above, and the control of the width along the planar direction of the SOI substrate 500 may easily be performed without increasing the steps. This is applicable to the connection part 6.

In the case where L1<L2, the rotation angle of the movable plate 2 may be made larger than in the case where L1=L2. That is, in this case, the tilt of the movable plate side shaft portion 422 relative to the X-axis when the first shaft part 42 bends is larger than the tilt of the drive plate side shaft portion 423. This is applicable to the connection part 6. Accordingly, the rotation angle of the movable plate 2 is larger relative to the rotation angles of the drive plates 41, 61. Thereby, the rotation angle of the movable plate 2 and the tilt at standing still may be made larger.

Further, in the case where L1<L2, contrary to the case where L1>L2, it is preferable that the deforming portion 4211 is formed to be easier to be torsionally deformed than the deforming portion 4212. This is applicable to the connection part 6.

Thus far, the connection parts 4, 6 have been explained, however, the same is applicable to the connection parts 5, 7. That is, given that the respective separation distance between the rotation center axis X1 and the center axis X4 of the non-deforming portion 5213 and separation distance between the rotation center axis X1 and the center axis X5 of the non-deforming portion 7213 are L3, and the respective separation distance between the center axis X4 and the rotation center axis X2 and separation distance between the center axis X5 and the rotation center axis X3 are L4, the magnitude relation between L3 and L4 is not particularly limited, and a relation L3>L4 may be satisfied, a relation L3=L4 may be satisfied, or a relation L3<L4 may be satisfied. The advantages of the cases where L3>L4, L3=L4, and L3<L4 are the same as those of the cases where L1>L2, L1=L2, and L1<L2, and their explanation will be omitted.

The relation between L1 and L2 and the relation between L3 and L4 may be the same or different. That is, L1=L2 and L3=L4, L1>L2 and L3>L4, or L1<L2 and L3<L4 may be satisfied, L1=L2 and L3>L4, L1>L2 and L3=L4, or L1>L2 and L3<L4 may be satisfied, or the like. Further, the L1 and L3 and the L2 and L4 may be equal or different, respectively.

As described above, in the light scanner 1, by changing the lengths and the relations of the L1, L2, L3, L4, different effects may be exerted. Accordingly, the light scanner 1 has advantageous convenience. Note that the lengths and the relations of the L1, L2, L3, L4 may appropriately be set based on intended use (required characteristics) of the light scanner 1.

Driving Unit 300

Next, the driving unit 300 will be explained.

As shown in FIG. 13, in the image forming apparatus 100, the light source unit 200 and the light scanner 1 are supported by a support part 400. The support part 400 has a shaft part 410 and the shaft part 410 is attached to an attachment part 430 via a bearing 420. The attachment part 430 is fixedly provided in a casing (not shown) of the image forming apparatus 100, for example. Further, the driving unit 300 rotates the light source unit 200 and the light scanner 1 integrally with the support part 400 around a predetermined axis line J. By integrally rotating the light source unit 200 and the light scanner 1 in this manner, the scanning region (the region in which an image is displayed) of the laser beam LL may be changed while the relative positional relation between the light source unit 200 and the movable plate 2 (the intersection of the rotation center axes X1, Y1) is kept, that is, without the need of alignment adjustment of the light source unit 200 and the light scanner 1.

Note that the predetermined axis line J may be provided to be perpendicular to one of the rotation center axes X1, Y1 of the light scanner 1, or provided not to be perpendicular to any of them or not in parallel, for example.

The driving unit 300 includes a first gear 310 provided in the above described support part 400, a second gear 320 that meshes with the first gear 310, and a motor 330 that rotates the second gear 320. The first gear 310 has plural teeth formed along the circumferential direction of the shaft part 410. On the other hand, the second gear 320 is attached to a shaft part 331 of the motor 330 and has plural teeth formed along the circumferential direction of the shaft part 331, and the teeth mesh with the first gear 310.

The motor 330 is attached to the attachment part 430, and rotates the second gear 320. More specifically, as shown in FIG. 14A, the motor 330 rotates the second gear 320 counter-clockwise to a predetermined angle, and thereby, rotates the support part 400 around the shaft part 410 clockwise into a first state. On the other hand, as shown in FIG. 14B, the motor 330 rotates the second gear 320 clockwise to a predetermined angle, and thereby, rotates the support part 400 around the shaft part 410 counter-clockwise into a second state.

The driving unit 300 including the motor 330 may make the image forming apparatus 100 relatively simple and inexpensive.

The configuration of the image forming apparatus 100 has been explained thus far. In the image forming apparatus 100, since the driving unit 300 is provided, as described in detail below, while the light scanner 1 is provided near the screen S, the region in which scanning (application) with the laser beam LL may be performed (light scanning region) may be made larger.

That is, as shown in FIG. 15, for example, while the region in which scanning with the laser beam LL may be performed by the light scanner 1 without driving the driving unit 300 to fix the support part 400 is S1, the region in which scanning with the laser beam LL may be performed by the light scanner 1 with the driving unit 300 driven to rotate the support part 400 is S2. As described above, according to the image forming apparatus 100, compared to the apparatus in related art (without the driving unit 300), the light scanning region may be made larger. Further, the image forming apparatus 100 is also advantageous in convenience in that the size of the light scanning region may appropriately be changed from S1 to S2 by appropriately setting whether to drive the driving unit 300 or not, and, in the case of driving, setting the rotation angle of the support part 400.

The image forming apparatus 100 displays an image on the screen S in the following manner, for example. As shown in FIG. 15, in the case where it is desired that a character string "SEIKO EPSON" is displayed on the screen S, the image forming apparatus 100 drives the driving unit 300 to rotate the support part 400, and outputs the laser beam LL in the desired color from the light source unit 200 in synchronization with the rotation of the support part 400 to perform vector scan using the light scanner 1, and thereby, displays the character string "SEIKO EPSON" on the screen S. In this regard, the light scanner 1 irregularly rotates the movable plate 2 around the respective axes of the rotation center axes X1, Y1 to scan with the laser beam LL to trace the respective characters of "SEIKO EPSON" or trace the outlines of the respective characters. According to the scanning method (vector scan), scanning with the laser beam may be performed only in the region to which the laser beam LL is desired to be applied, and the image may efficiently be displayed on the screen S.

Second Embodiment

Next, the second embodiment of the image forming apparatus of the invention will be explained.

Figure 16:
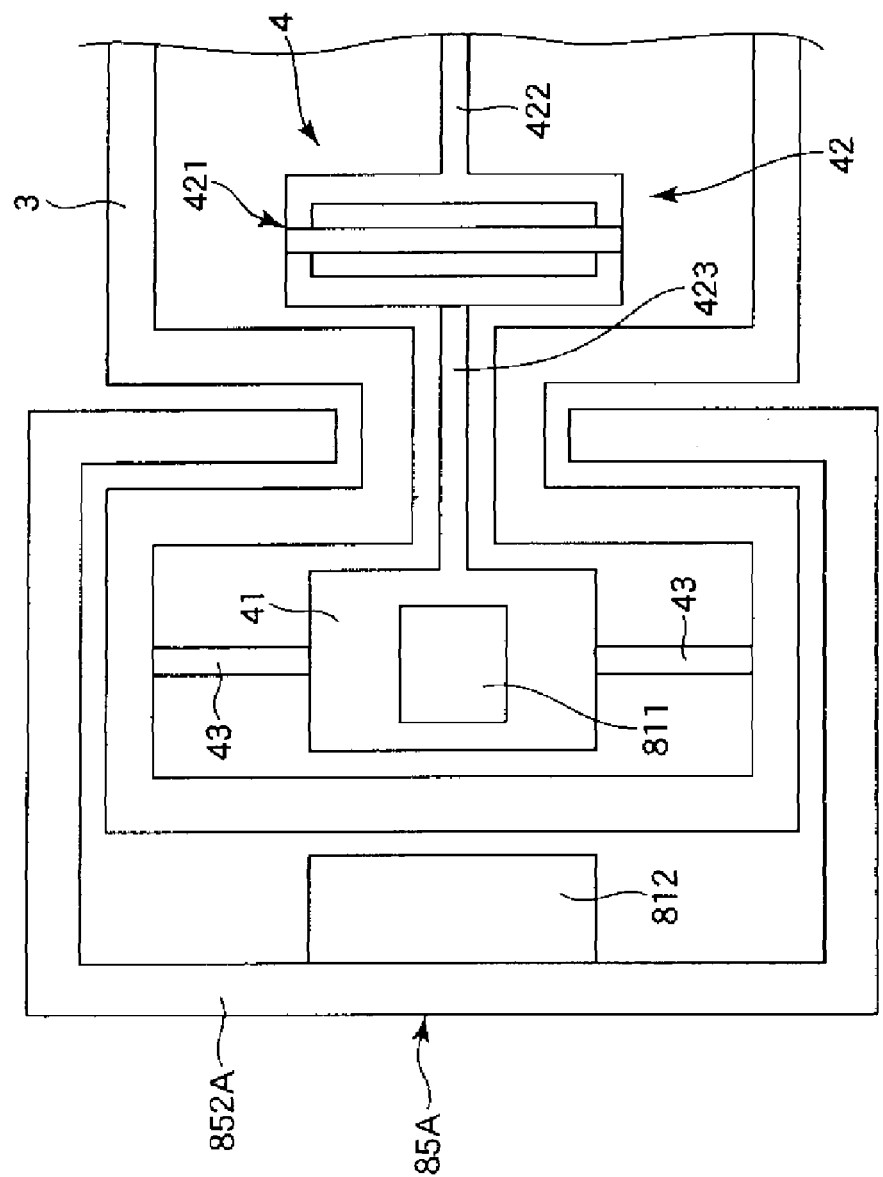
FIG. 16 is a plan view of a light scanner of an image forming apparatus of a second embodiment according to the invention.

FIG. 16 is a plan view of a light scanner of the image forming apparatus of the second embodiment according to the invention.

As below, regarding the image forming apparatus of the second embodiment, differences from the image forming apparatus of the above described embodiment will be centered, and the explanation of the same items will be omitted.

The image forming apparatus of the second embodiment is substantially the same as the image forming apparatus of the first embodiment except that the configuration of the coil fixing part of the light scanner is different. The same signs are assigned to the same configurations as those of the above described first embodiment.

In the light scanner 1 of the embodiment, a coil fixing part 85A has a main body portion 852A formed to surround the coil 812 and the permanent magnet 811 (with the part corresponding to the first shaft part 42 removed). The main body portion 852A prevents or suppresses the magnetic force generated from the coil 812 from leaking outside of the coil fixing part 85A while acting on the permanent magnet 811. That is, the main body portion 852A has anti-magnetism. Thereby, for example, the magnetic field generated from the coil 812 may be prevented from acting on the permanent magnets 821, 831, 841 at the opposite side, and the light scanner 1 may stably be driven.

The configuration of the main body portion 852A is not particularly limited as long as it may exert the above described effect, and, for example, it may be formed by an anti-magnetic material, or anti-magnetic coating may be applied to the surface thereof.

The coil fixing parts (not shown) that fix the coils 822, 832, 842 have the same configuration as that of the coil fixing part 85A.

According to the second embodiment, the same effect as that of the first embodiment may be exerted.

Third Embodiment

Next, the third embodiment of the image forming apparatus of the invention will be explained.

Figure 17:
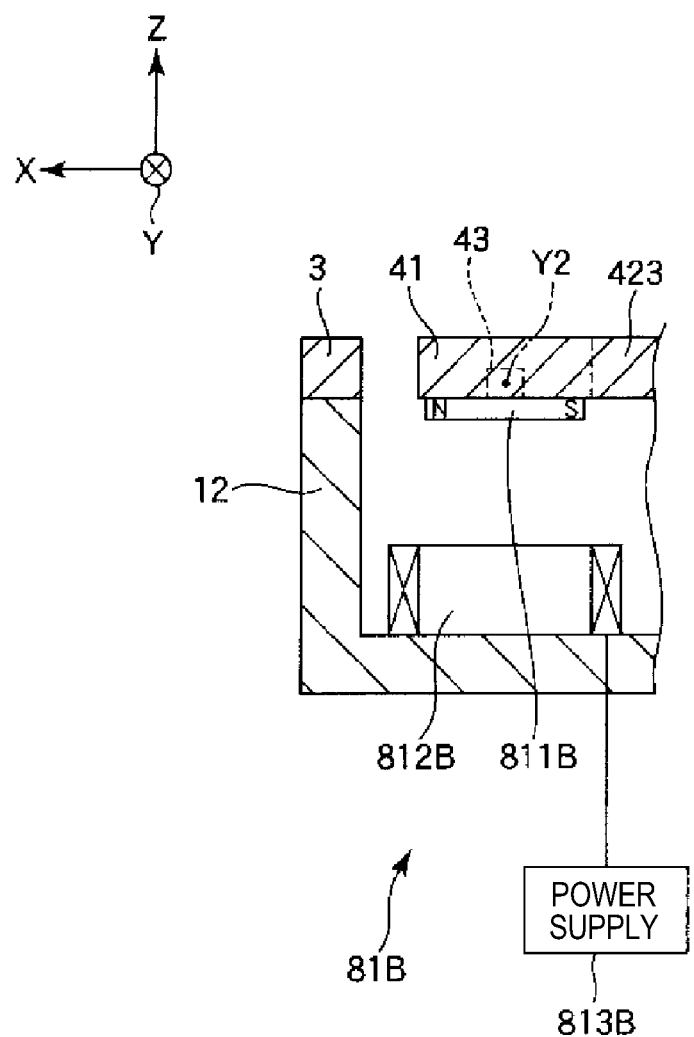
FIG. 17 is a plan view of a light scanner of an image forming apparatus of a third embodiment according to the invention.

FIG. 17 is a plan view of a light scanner of the image forming apparatus of the third embodiment according to the invention.

As below, regarding the image forming apparatus of the third embodiment, differences from the image forming apparatuses of the above described embodiments will be centered, and the explanation of the same items will be omitted.

The image forming apparatus of the third embodiment is substantially the same as the above described image forming apparatuses except that the configuration of the displacing unit of the light scanner is different. Note that, in the embodiment, the configurations of the first displacement part, the second displacement part, the third displacement part, and the fourth displacement part of the displacing unit are the same as one another, and the first displacement part will representatively be explained, and the explanation of the second displacement part, the third displacement part, and the fourth displacement part will be omitted. Further, the same signs are assigned to the same configurations as those of the above described first embodiment.

As shown in FIG. 17, a first displacement part 81B has a permanent magnet 811B, a coil 812B, and a power supply 813B. The permanent magnet 811B has a flat plate shape and is fixed to the lower surface (the surface at the base 12 side) of the drive plate 41. Further, the permanent magnet 811B is provided so that the S-pole and the N-pole are opposed with respect to the rotation center axis Y2 when fixed to the drive plate 41.

The coil 812B is provided below the permanent magnet 811B. The coil 812B may generate a magnetic field in the X-axis direction when a voltage is applied from the power supply 813B. Further, by the action of the magnetic field generated from the coil 812B, one of the S-pole and the N-pole of the permanent magnet 811B is attracted to the coil 812B and the other is moved away from the coil 812B, and thereby, the drive plate 41 may be tilted around the rotation center axis Y2.

According to the third embodiment, the same effect as that of the first embodiment may be exerted.

Fourth Embodiment

Next, the fourth embodiment of the image forming apparatus of the invention will be explained.

Figure 18:
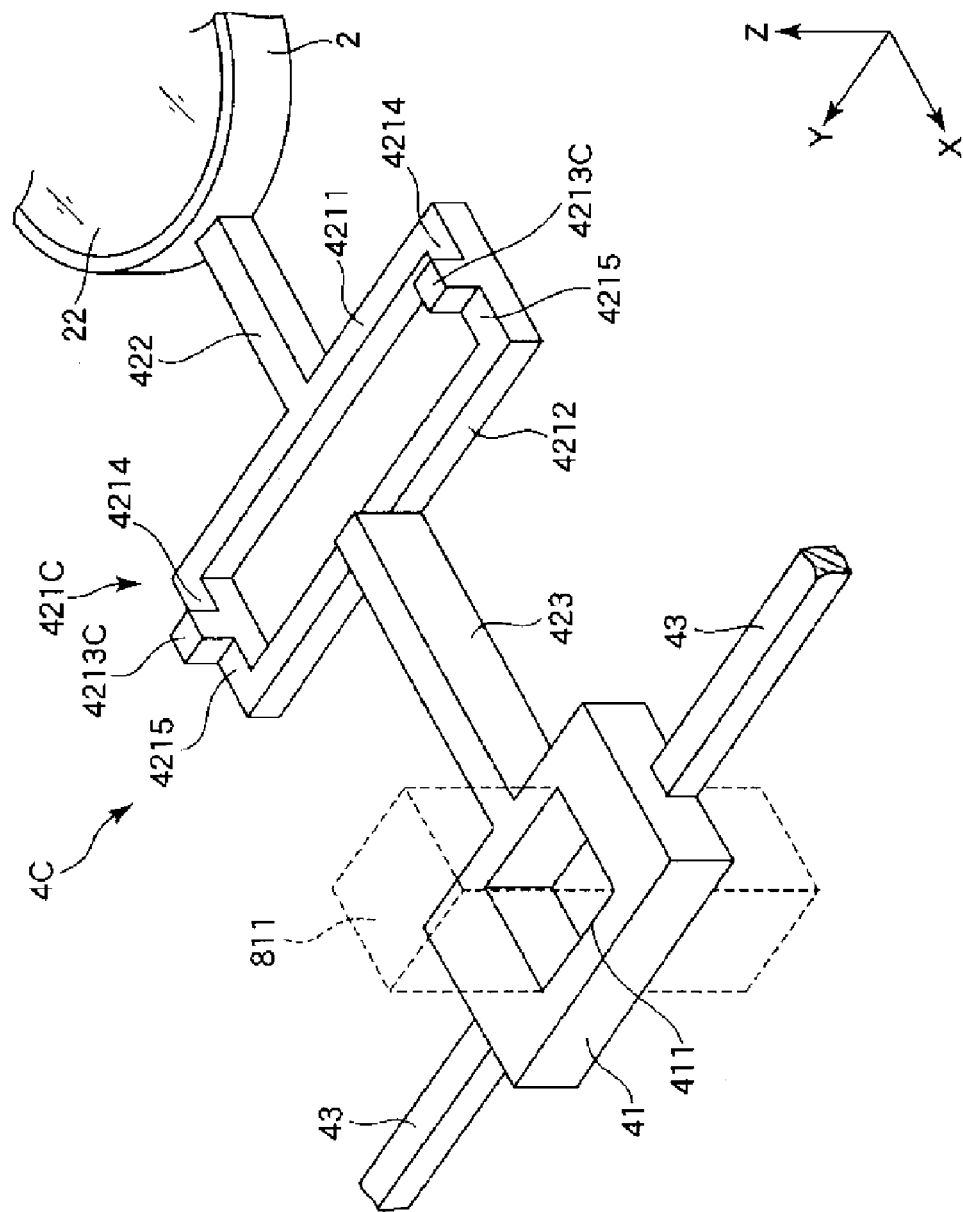
FIG. 18 is a perspective view of a light scanner of an image forming apparatus of a fourth embodiment according to the invention.

FIG. 18 is a perspective view of a light scanner of the image forming apparatus of the fourth embodiment according to the invention.

As below, regarding the image forming apparatus of the fourth embodiment, differences from the image forming apparatuses of the above described embodiments will be centered, and the explanation of the same items will be omitted.

The image forming apparatus of the fourth embodiment is substantially the same as the above described image forming apparatuses except that the configurations of the non-deforming portions of the stress relaxing portions of the respective connection parts of the light scanner are different. Note that, in the embodiment, the configurations of the non-deforming portions in the respective connection parts 4, 5, 6, 7 are the same as one another, and the connection part 4 will representatively be explained, and the explanation of the connection parts 5, 6, 7 will be omitted. Further, the same signs are assigned to the same configurations as those of the above described first embodiment.

As shown in FIG. 18, in a stress relaxing portion 421C of a connection part 4C, a pair of non-deforming portions 4213C are provided. The pair of non-deforming portions 4213C are separated from each other in the Y-axis direction, and located on one axis line in parallel to the Y-axis. Even by the connection part 4C having the configuration, the first shaft part 42C may locally be bent with the line segment connecting the pair of non-deforming portions 4213C as an axis.

According to the fourth embodiment, the same effect as that of the first embodiment may be exerted.

Fifth Embodiment

Next, the fifth embodiment of the image forming apparatus of the invention will be explained.

Figure 19:
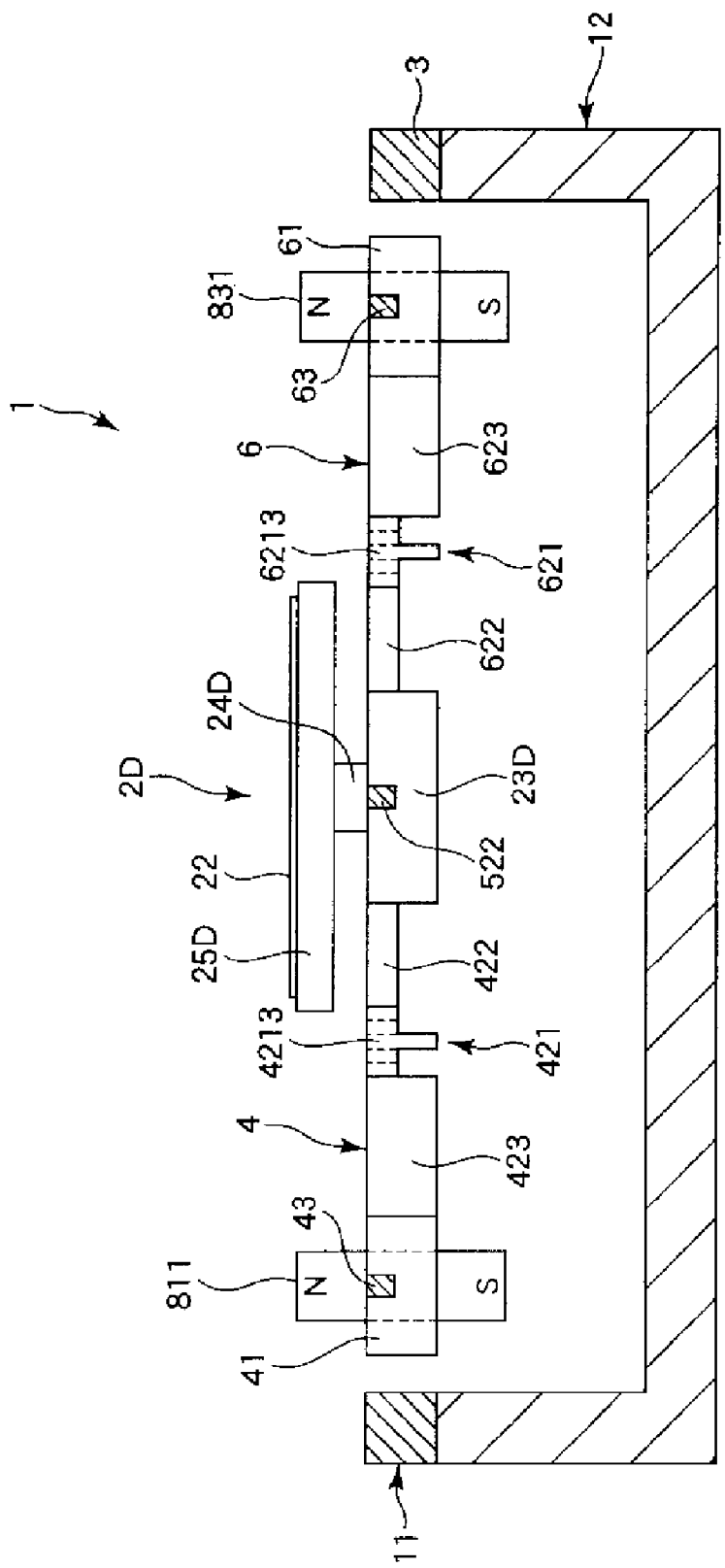
FIG. 19 is a sectional view of a light scanner of an image forming apparatus of a fifth embodiment according to the invention.

FIG. 19 is a sectional view of a light scanner of the image forming apparatus of the fifth embodiment according to the invention.

As below, regarding the image forming apparatus of the fifth embodiment, differences from the image forming apparatuses of the above described embodiments will be centered, and the explanation of the same items will be omitted.

The image forming apparatus of the fifth embodiment is substantially the same as the above described image forming apparatuses except that the orientation of the vibration system and the configuration of the movable plate of the light scanner are different. Note that, the same signs are assigned to the same configurations as those of the above described first embodiment.

As shown in FIG. 19, in the embodiment, the orientation of the vibration system 11 is opposite to that in the above described embodiments. That is, the vibration system. 11 is provided so that the surface that has been located at the base 12 side in the above described embodiments may be located opposite to the base 12, and the surface that has been located at the opposite side to the base 12 may be located at the base side 12.

Further, in the embodiment, a movable plate 2D has a base part 23D connected to the respective connection parts 4, 5, 6, 7, and a light reflection plate 25D fixed to the base part 23D via a column part 24D. In the movable plate 2D, the light reflection part 22 is provided on the upper surface of the light reflection plate 25D. According to the movable plate 2 having the configuration, the area of the light reflection part 22 may be made larger while upsizing of the light scanner 1 may be prevented. Thereby, the laser beam LL having the thicker luminous flux may be reflected by the light reflection part 22. Further, the heat generated in the light reflection by the light reflection part 22 may be made difficult to be transmitted to the respective connection parts 4, 5, 6, 7, and the thermal expansion of the connection parts 4, 5, 6, 7 may be suppressed. In view of the prevention of the heat transmission to the respective connection parts 4, 5, 6, 7, the column part 24D may be formed by a material having a good thermal insulation property.

Note that, any shape and any size of the light reflection plate 25D may be employed as long as they may not hinder the driving of the light scanner 1, and, for example, it is preferable that the light reflection plate 25D has the shape and the size that may be fitted between the pair of non-deforming portions 4213, 6213 in the X-axis direction and fitted between the pair of non-deforming portions 5213, 7213 in the Y-axis direction. Thereby, when the first shaft parts 42, 52, 62, 72 of the respective connection parts 4, 5, 6, 7 bend, contact between one of the drive plate side shaft portions 423, 523, 623, 723 and the light reflection plate 25D may reliably be prevented.

Specifically, as the shape of the light reflection plate 25D in the plan view, for example, a circular shape having a diameter smaller than the separation distance between the pair of non-deforming portions 4213, 6213 is preferable. Further, it is also preferable that its length in the X-axis direction is shorter than the separation distance between the pair of non-deforming portions 4213, 6213 and its length in the Y-axis direction is shorter than the separation distance between the pair of non-deforming portions 5213, 7213.

According to the fifth embodiment, the same effect as that of the first embodiment may be exerted.

Sixth Embodiment

Next, the sixth embodiment of the image forming apparatus of the invention will be explained.

Figure 20:
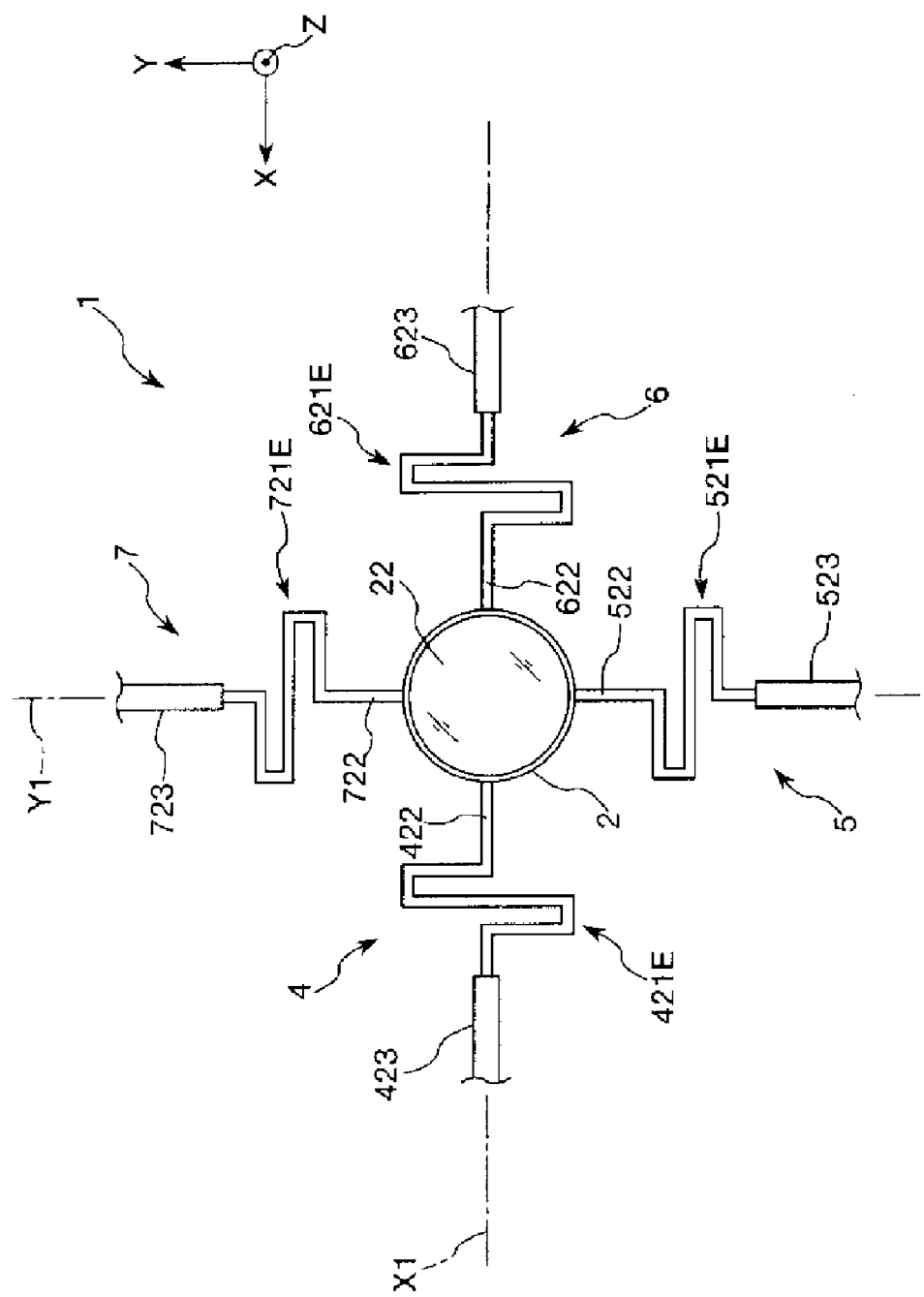
FIG. 20 is a plan view of a light scanner of an image forming apparatus according to a sixth embodiment of the invention.
Figure 21:
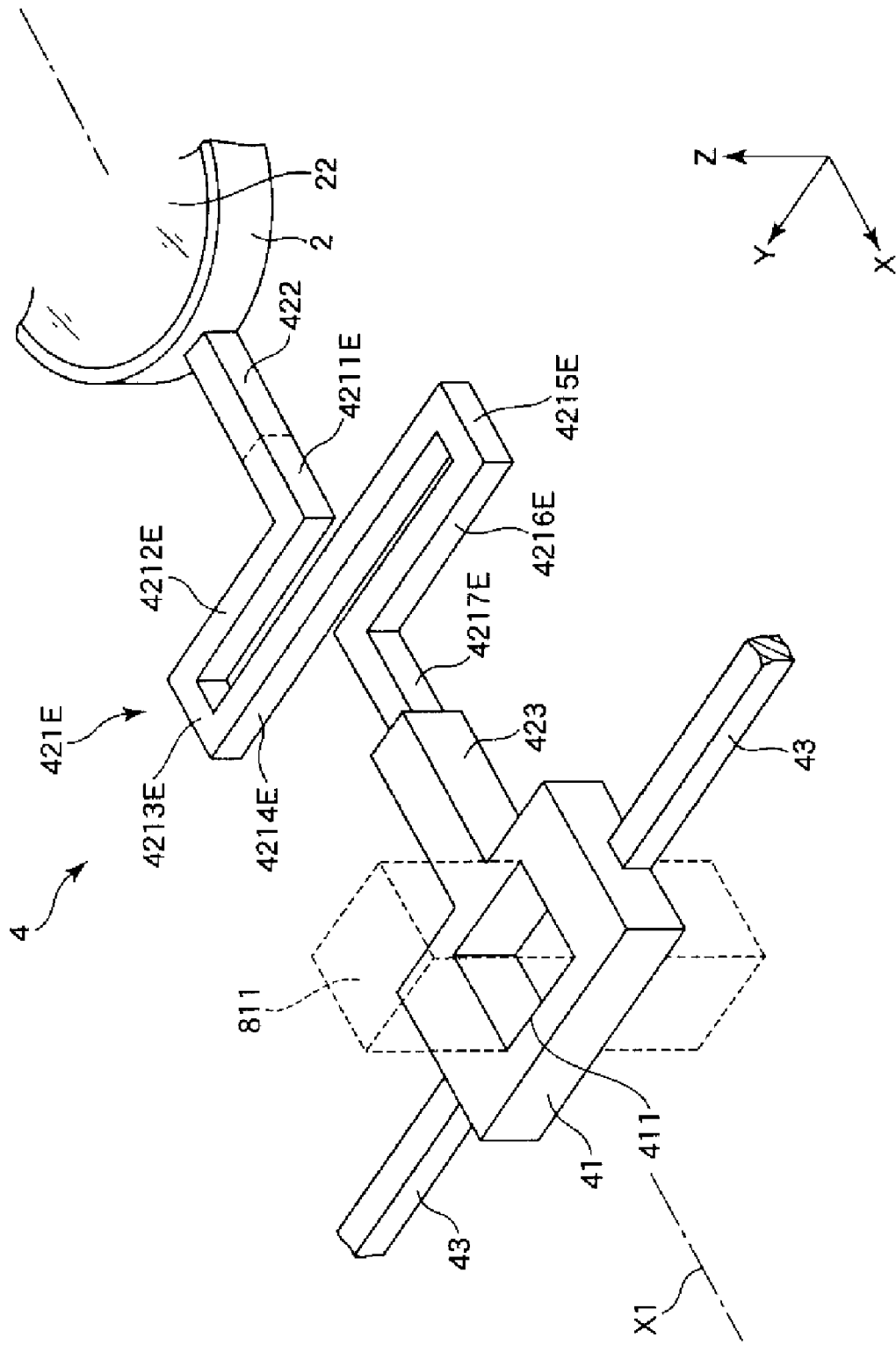
FIG. 21 is an enlarged perspective view of a connection part of the light scanner shown in FIG. 20.

FIG. 20 is a plan view of a light scanner of the image forming apparatus of the sixth embodiment of the invention, and FIG. 21 is an enlarged perspective view of a connection part of the light scanner shown in FIG. 20.

As below, regarding the image forming apparatus of the sixth embodiment, differences from the image forming apparatuses of the above described embodiments will be centered, and the explanation of the same items will be omitted.

The image forming apparatus of the sixth embodiment is substantially the same as the above described image forming apparatuses except that the configurations of the stress relaxing portions of the light scanner are different. Note that, the same signs are assigned to the same configurations as those of the above described first embodiment.

As shown in FIG. 20, stress relaxing portions 421E, 521E, 621E, 721E of the respective connection parts 4, 5, 6, 7 have meander structures meandering to alternately extend in the X-axis direction and the Y-axis direction. These stress relaxing portions 421E, 521E, 621E, 721E have the same configuration as one another, and the stress relaxing portion 421E will representatively be explained and the explanation of the other stress relaxing portions 521E, 621E, 721E will be omitted.

As shown in FIG. 21, the stress relaxing portion 421E has a first extending portion 4211E connected to the movable plate side shaft portion 422 and extending in the X-axis direction, a second extending portion 4212E extending from an end of the first extending portion 4211E toward the Y-axis direction, a third extending portion 4213E extending from an end of the second extending portion 4212E toward the X-axis direction, a fourth extending portion 4214E extending from an end of the third extending portion 4213E toward the Y-axis direction, a fifth extending portion 4215E extending from an end of the fourth extending portion 4214E toward the X-axis direction, a sixth extending portion 4216E extending from an end of the fifth extending portion 4215E toward the Y-axis direction, and a seventh extending portion 4217E extending from an end of the sixth extending portion 4216E toward the X-axis direction.

The first extending portion 4211E and the seventh extending portion 4217E of the four extending portions 4211E, 4213E, 4215E, 4217E extending in the X-axis direction are provided on the rotation center axis X1 in the XY plan view, and the third extending portion 4213E and the fifth extending portion 4215E are provided at the opposite sides to each other with respect to the rotation center axis X1 in the XY plan view (plan view in FIG. 15). Note that it is preferable that the separation distances from the third extending portion 4213E and the fifth extending portion 4215E to the rotation center axis X1 are equal to each other.

On the other hand, the fourth extending portion 4214E of the three extending portions 4212E, 4214E, 4216E extending in the Y-axis direction is provided across the rotation center axis X1 in the XY plan view, and the second extending portion 4212E and the sixth extending portion 4216E are provided at the opposite sides to each other with respect to the rotation center axis X1 in the XY plan view. Note that it is preferable that the three extending portions 4212E, 4214E, 4216E are arranged at equal pitches in the X-axis direction. That is, it is preferable that the separation distance between the second extending portion 4212E and the fourth extending portion 4214E and the separation distance between the fourth extending portion 4214E and the sixth extending portion 4216E are equal.

The above explained seven extending portions 4211E to 4217E are respectively torsionally deformable and curvedly deformable around their center axes. For example, these seven extending portions 4211E to 4217E are formed by the second $SiO_2$ substrate of the above described first embodiment shown by FIGS. 6A to 7C.

In the stress relaxing portion 421E, the respective extending portions 4211E to 4217E perform at least one of torsional deformation or curved deformation, and thereby, the first shaft part 42 may be bent with the fourth extending portion 4214E as an axis, and further, the stress generated by the torsional deformation of the movable plate side shaft portion 422 may be relaxed.

The stress relaxing portion 421E has been explained thus far.

In the embodiment, the stress relaxing portions 521E, 621E, 721E have configurations formed by rotating the stress relaxing portion 421E to 90°, 180°, 270° clockwise in FIG. 20. That is, the stress relaxing portions 421E, 621E opposed via the movable plate 2 are rotationally symmetric with respect to the movable plate 2, and the stress relaxing portions 521E, 721E opposed via the movable plate 2 are rotationally symmetric with respect to the movable plate 2.

Note that the stress relaxing portion 421E has the configuration in which the seven extending portions alternately extend in the X-axis direction and the Y-axis direction, however, the number of extending portions is not limited to that, but, for example, may be eleven or fifteen. It is preferable that, of the plural extending portions extending in the X-axis direction, the number of extending portions at one side with respect to the rotation center axis X1 and the number of extending portions at the other side are equal.

According to the sixth embodiment, the same effect as that of the first embodiment may be exerted.

Seventh Embodiment

Next, the seventh embodiment of the image forming apparatus of the invention will be explained.

Figure 22:
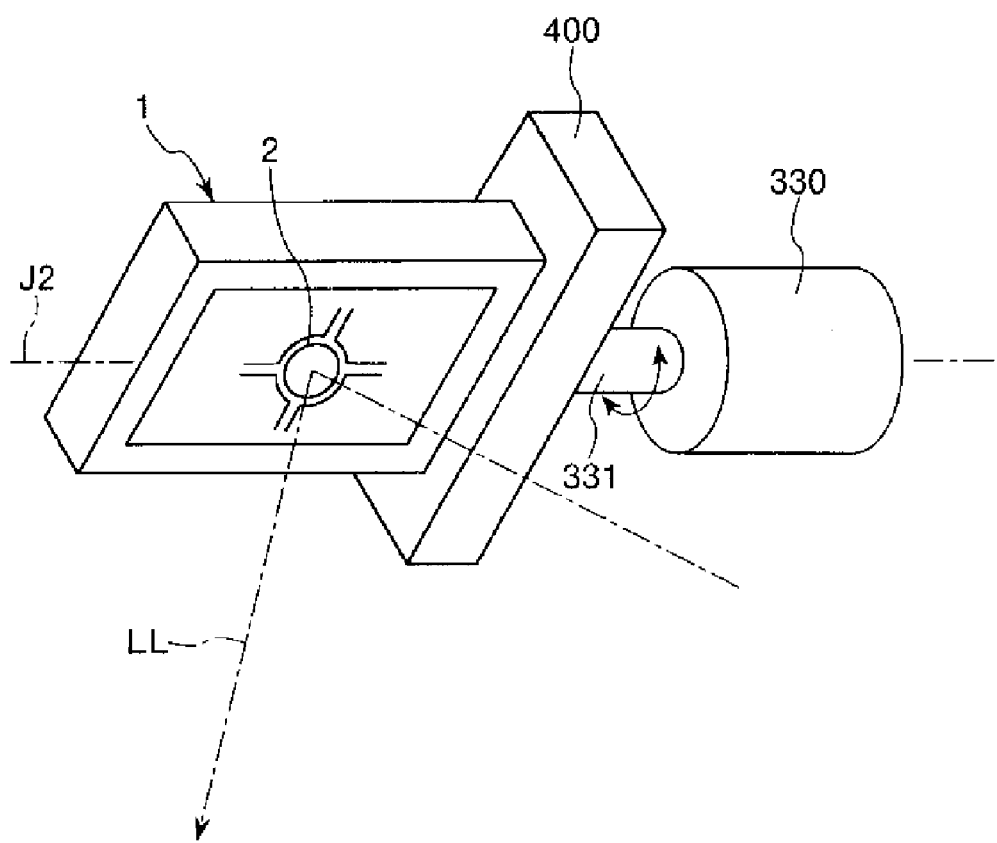
FIG. 22 is a perspective view of the light scanner of the image forming apparatus of a seventh embodiment according to the invention.

FIG. 22 is a perspective view of the light scanner of the image forming apparatus of the seventh embodiment according to the invention.

As below, regarding the image forming apparatus of the seventh embodiment, differences from the image forming apparatuses of the above described embodiments will be centered, and the explanation of the same items will be omitted.

The image forming apparatus of the seventh embodiment is substantially the same as the image forming apparatuses of the first embodiment except that the mechanism that rotates the light scanner is different. Note that, in FIG. 22, the same signs are assigned to the same configurations as those of the above described embodiments.

As shown in FIG. 22, in the embodiment, only the light scanner 1 is supported by the support part 400. That is, unlike the above described first embodiment, the light source unit 200 is not supported by the support part 400. The support part 400 is attached to the shaft part 331 of the motor 330, and the light scanner 1 is rotated integrally with the support part 400 around a predetermined axis line J2. Further, in the embodiment, the rotation of the light scanner 1 around the axis line J2 is designed to be performed with the relative positional relation between the intersection of the rotation center axis X1 and the rotation center axis Y2 of the movable plate 2 of the light scanner 1 and the light source unit 200 (i.e., the optical path length of the laser beam LL) kept constant. Thereby, the scanning region of the laser beam LL may be changed without the need of alignment adjustment of the light source unit 200 and the light scanner 1.

According to the seventh embodiment, the same effect as that of the first embodiment may be exerted.

As described above, the image forming apparatuses according to the invention have been explained with reference to the shown embodiments, however, the invention is not limited to those. For example, in the image forming apparatuses of the invention, the configurations of the respective parts may be replaced by arbitrary configurations that fulfill the same functions, and arbitrary configurations may be added. Further, in the image forming apparatuses according to the invention, the above described embodiments may appropriately be combined.

Furthermore, in the above described embodiments, as the configuration of the displacing unit of the light scanner, the configuration of employing electromagnetic driving using the permanent magnet and the electromagnetic coil has been explained, however, the configuration is not limited to that as long as the movable plate may be displaced as described above, and, for example, electrostatic driving or piezoelectric driving may be employed for the displacing unit.

In addition, in the above described embodiments, the configuration in which the first shaft part of each connection part of the light scanner has the stress relaxing portion has been explained, however, not limited to that, the stress relaxing portion may be omitted. That is, in the first shaft part of each connection part, the movable plate side shaft portion and the drive plate side shaft portion may directly be connected.

Further, in the above described embodiments, the configuration in which the drive plate side shaft portion of each connection part is not deformed at driving of the light scanner has been explained, however, not limited to that, for example, the portion may be curvedly deformed in the Z-axis direction.

Furthermore, in the above described embodiments, the sections to be deformed (the second shaft parts, the movable plate side shaft portions, the deforming portions, and the connection portions) of each connection part and the sections not to be deformed (the drive plates, the drive plate side shaft portions, and the non-deforming portions) are distinctively formed by differentiating the thickness of the SOI substrate, however, not limited to that, for example, the sections to be deformed and the sections not to be deformed may distinctively be formed by differentiating the width.

The entire disclosure of Japanese Patent Application No. 2010-037998, filed Feb. 23, 2010 is expressly incorporated by reference herein.

What is claimed is:

1. An image forming apparatus comprising:
a light output unit that outputs light;
a light scanner that has a light reflection part for reflecting the light output from the light output unit, the light reflection part being rotatable around a first axis and a second axis that are orthogonal to each other, and the light scanner being operable to scan the light reflected by the light reflection part respectively around the first axis and the second axis;
a scanner rotating unit that rotates the light scanner around a predetermined axis line while keeping a relative positional relation between an intersection of the first axis and the second axis and the light output unit constant; and
a support part that supports the light output unit and the light scanner while maintaining a relative positional relation to each other, the scanner rotating unit being operable to rotate the light output unit and the light scanner integrally with the support part;
wherein the light scanner has:
a movable unit that is displaceable and includes the light reflection part,
four connection parts connected to the movable unit, and
a scanner support part that supports the four connection parts,
the four connection parts are provided at intervals of 90 degrees in an outer circumference of the movable unit along a circumferential direction in a plan view of the movable unit, and
wherein each of the connection parts has:
a rotatable drive unit, and
a shaft part that connects the movable unit and the drive unit and bendingly deforms in a thickness direction of the movable unit by rotation of the drive unit, and
the respective shaft parts are independently bendingly deformed, and thereby, the movable unit rotates around the respective axes of the first axis and the second axis.

2. The image forming apparatus according to claim 1, wherein the light scanner scans with the light by vector scan of sequentially forming line segments connecting different two points on a display surface to which the light reflected by the light reflection part is applied.

3. The image forming apparatus according to claim 1, wherein the scanner rotating unit includes a motor.

4. An image forming apparatus comprising:
a light output unit that outputs light;
a light scanner that has a light reflection part for reflecting the light output from the light output unit, the light reflection part being rotatable around a first axis and a second axis that are orthogonal to each other, and the light scanner being operable to scan the light reflected by the light reflection part respectively around the first axis and the second axis; and
a scanner rotating unit that rotates the light scanner around a predetermined axis line while keeping a relative positional relation between an intersection of the first axis and the second axis and the light output unit constant,
wherein the light scanner has:
a movable unit that is displaceable and includes the light reflection part,
four connection parts connected to the movable unit,
a scanner support part that supports the four connection parts, and
the four connection parts are provided at intervals of 90 degrees in an outer circumference of the movable unit along a circumferential direction in a plan view of the movable unit,
wherein each of the connection parts has:
a rotatable drive unit, and
a shaft part that connects the movable unit and the drive unit and bendingly deforms in a thickness direction of the movable unit by rotation of the drive unit and
the respective shaft parts are independently bendingly deformed, and thereby, the movable unit rotates around the respective axes of the first axis and the second axis,
wherein, given that the two axes orthogonal in the plan view of the movable unit are the X-axis and the Y-axis, the four connection parts have a first connection part and a second connection part opposed in an X-axis direction via the movable unit and a third connection part and a fourth connection part opposed in a Y-axis direction via the movable unit,
wherein each of the first connection part and the second connection part has the drive unit provided separately from the movable unit in the X-axis direction, a first shaft part as the shaft part connecting the movable unit and the drive unit and extending in the X-axis direction, and a second shaft part connecting the drive unit and the scanner support part and extending in the Y-axis direction, and
wherein each of the third connection part and the fourth connection part has the drive unit provided separately from the movable unit in the Y-axis direction, a first shaft part as the shaft part connecting the movable unit and the drive unit and extending in the Y-axis direction, and a second shaft part connecting the drive unit and the scanner support part and extending in the X-axis direction.

5. The image forming apparatus according to claim 4, wherein, given that an axis orthogonal to the X-axis and the Y-axis is the Z-axis, each of the first shaft parts of the four connection parts may perform a first deformation of bending into a V-shape convex toward one side in the Z-axis direction, and a second deformation of bending into a V-shape convex toward the other side in the Z-axis direction.

6. The image forming apparatus according to claim 5, wherein a state in which the first shaft part of the first connection part is allowed to perform the first deformation and the first shaft part of the second connection part is allowed to perform the second deformation and a state in which the first shaft part of the first connection part is allowed to perform the second deformation and the first shaft part of the second connection part is allowed to perform the first deformation are alternately repeated, and thereby, the movable unit is rotated around the Y-axis, and
a state in which the first shaft part of the third connection part is allowed to perform the first deformation and the first shaft part of the fourth connection part is allowed to perform the second deformation and a state in which the first shaft part of the third connection part is allowed to perform the second deformation and the first shaft part of the fourth connection part is allowed to perform the first deformation are alternately repeated, and thereby, the movable unit is rotated around the X-axis.

7. The image forming apparatus according to claim 4, wherein each of the first shaft parts of the four connection parts has a stress relaxing portion provided between the movable unit and the drive unit, a movable unit side shaft portion connecting the stress relaxing portion and the movable unit, and a drive unit side shaft portion connecting the stress relaxing portion and the drive unit, and bends in the stress relaxing portion.

8. The image forming apparatus according to claim 7, wherein each of the movable unit side shaft portions of the four connection parts torsionally deforms around a center axis of the movable unit side shaft portion.

9. The image forming apparatus according to claim 7, wherein each of the drive unit side shaft portions of the four connection parts does not deform.

10. The image forming apparatus according to claim 7, wherein each of the stress relaxing portions of the four connection parts has a deforming portion that extends in a direction orthogonal to an extending direction of the movable unit side shaft portion and the drive unit side shaft portion in the plan view of the movable unit and torsionally deforms around a center axis.

11. The image forming apparatus according to claim 10, wherein each of the stress relaxing portions of the four connection parts has a pair of the deforming portions, and
one deforming portion of the pair of deforming portions is connected to the movable unit side shaft portion and the other deforming portion is connected to the drive unit side shaft portion.

12. The image forming apparatus according to claim 11, wherein each of the stress relaxing portions of the four connection parts has a non-deforming portion provided between the pair of the deforming portions, extending in a direction in parallel to an extending direction of the deforming portions, and does not torsionally deform around the center axis.

13. The image forming apparatus according to claim 7, wherein each of the stress relaxing portions of the four connection parts has a section alternately extending and meandering in the X-axis direction and the Y-axis direction.

14. The image forming apparatus according to claim 13, wherein each of the stress relaxing portions of the four connection parts has plural extending portions extending in the X-axis direction and plural extending portions extending in the Y-axis direction, and each of the plural extending portions is torsionally deformable and curvedly deformable around a center axis.

15. The image forming apparatus according to claim 12, wherein each of the four connection parts is formed by an SOI substrate in which a first Si layer, an $SiO_2$ layer, and a second Si layer are stacked in this order.

16. An image forming apparatus comprising:
a light output unit that outputs light;
a light scanner that has a light reflection part for reflecting the light output from the light output unit, the light reflection part being rotatable around a first axis and a second axis that are orthogonal to each other, and the light scanner being operable to scan the light reflected by the light reflection part respectively around the first axis and the second axis; and
a scanner rotating unit that rotates the light scanner around a predetermined axis line while keeping a relative positional relation between an intersection of the first axis and the second axis and the light output unit constant,
wherein the light scanner has:
a movable unit that is displaceable and includes the light reflection part,
four connection parts connected to the movable unit,
a scanner support part that supports the four connection parts, and
the four connection parts are provided at intervals of 90 degrees in an outer circumference of the movable unit along a circumferential direction in a plan view of the movable unit,
wherein each of the connection parts has:
a rotatable drive unit, and
a shaft part that connects the movable unit and the drive unit and bendingly deforms in a thickness direction of the movable unit by rotation of the drive unit,
a displacement providing unit that rotates the drive unit, and
the respective shaft parts are independently bendingly deformed, and thereby, the movable unit rotates around the respective axes of the first axis and the second axis, and
wherein four of the displacement providing parts are provided in correspondence with the four connection parts.

17. The image forming apparatus according to claim 16, wherein each of the four displacement providing units has a permanent magnet provided in the corresponding drive unit, and a coil that generates a magnetic field acting on the permanent magnet.

18. The image forming apparatus according to claim 17, wherein, in the four displacement providing units, the permanent magnets are provided so that both poles may be opposed in the thickness direction of the movable unit, and the coils are provided to generate magnetic fields in a direction orthogonal to the thickness direction of the movable unit.

19. The image forming apparatus according to claim 17, wherein each of the permanent magnets of the four displacement providing units is provided through the drive unit.

* * * * *